Feb. 2, 1971         R. B. RYAN ET AL         3,560,849
 LIQUID TEMPERATURE CONTROLLED TEST CHAMBER AND TRANSPORT
         APPARATUS FOR ELECTRICAL CIRCUIT ASSEMBLIES
Filed Aug. 15, 1967                          10 Sheets-Sheet 1

Fig. 1

Robert B. Ryan
August A. Zachmeier
Hans D. Heyck
Robert E. Garman
    INVENTOR

BY
          ATTORNEY

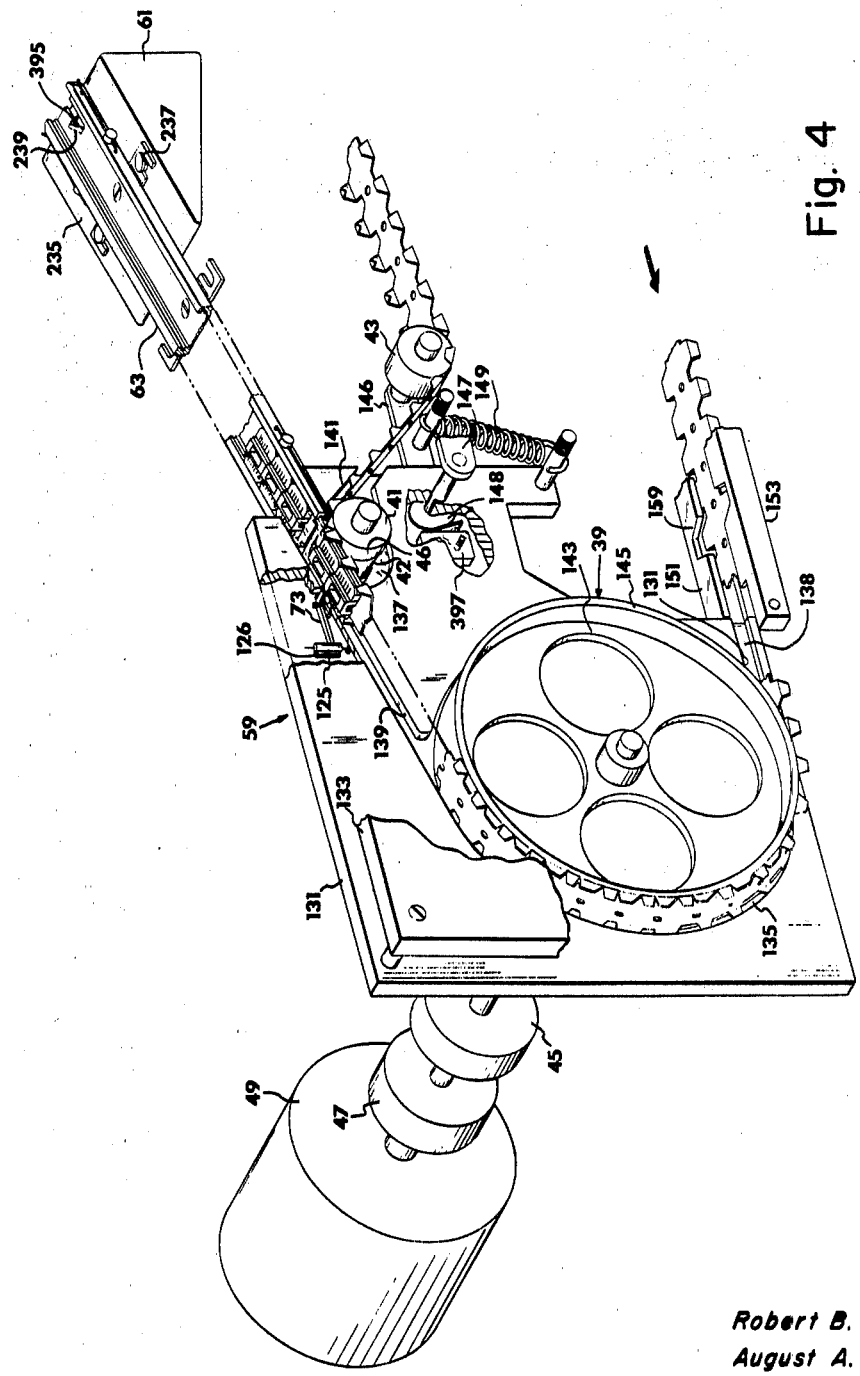

Feb. 2, 1971  R. B. RYAN ET AL  3,560,849
LIQUID TEMPERATURE CONTROLLED TEST CHAMBER AND TRANSPORT
APPARATUS FOR ELECTRICAL CIRCUIT ASSEMBLIES
Filed Aug. 15, 1967  10 Sheets-Sheet 5
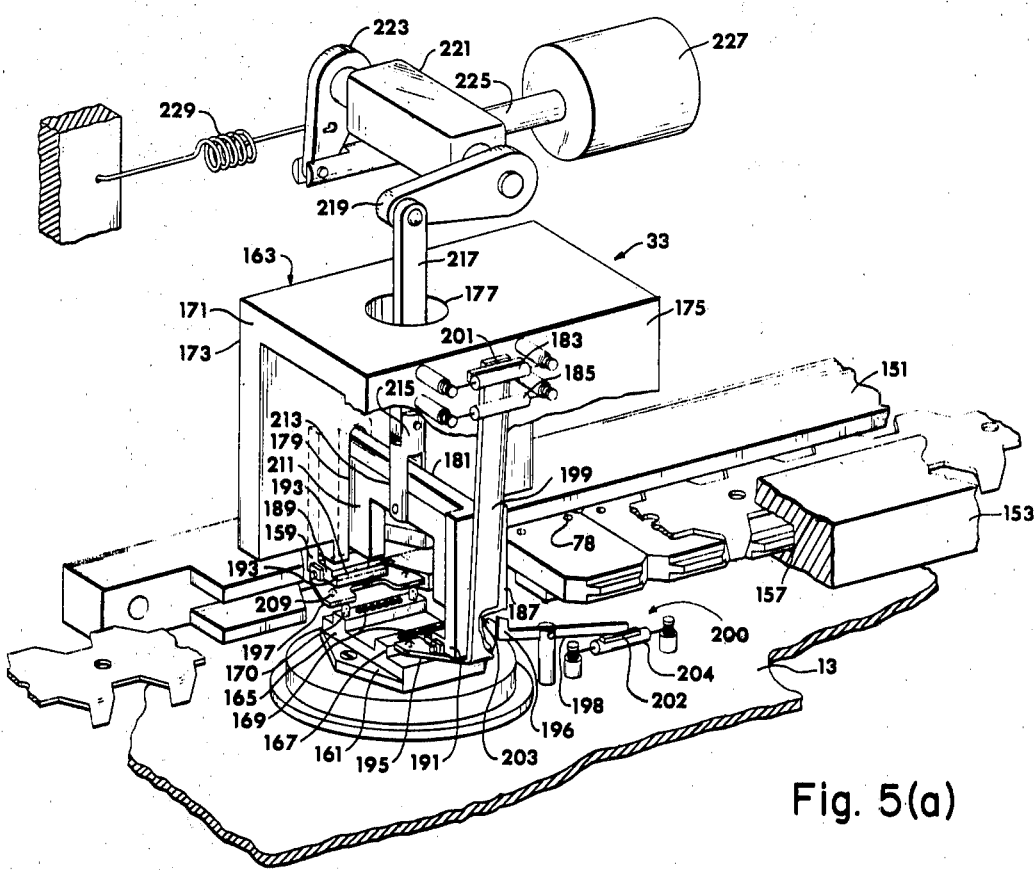
Fig. 5(a)
Robert B. Ryan
August A. Zachmeier
Hans D. Heyck
Robert E. Garman
INVENTOR
ATTORNEY

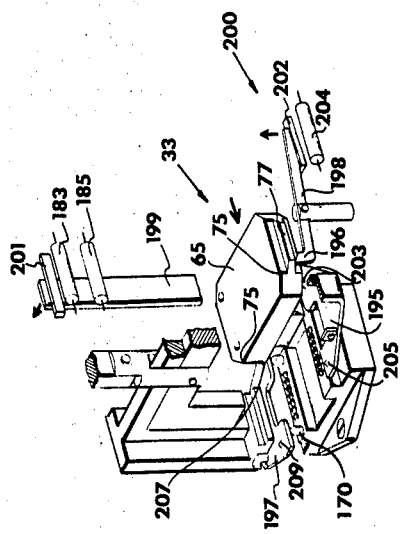
Fig. 5(b)
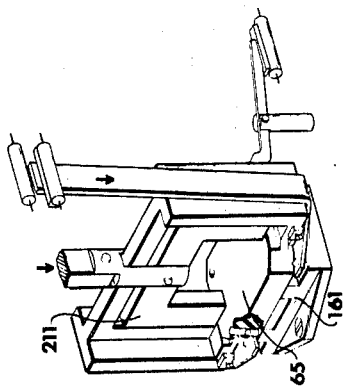
Fig. 5(e)
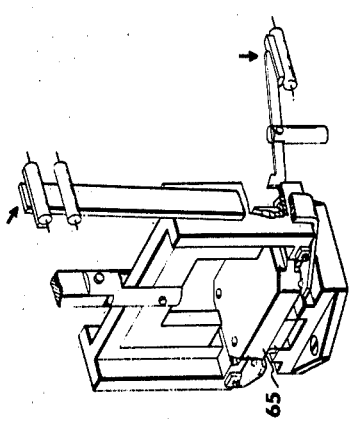
Fig. 5(c)
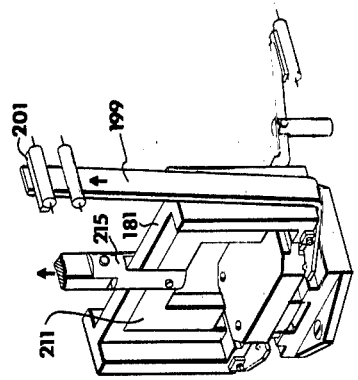
Fig. 5(f)
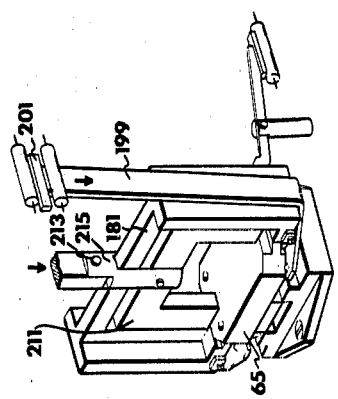
Fig. 5(d)
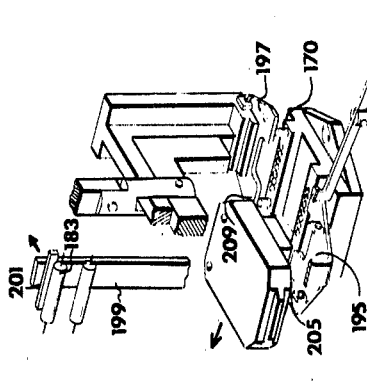
Fig. 5(g)
Robert B. Ryan
August A. Zachmeier
Hans D. Heyck
Robert E. German
INVENTOR
ATTORNEY

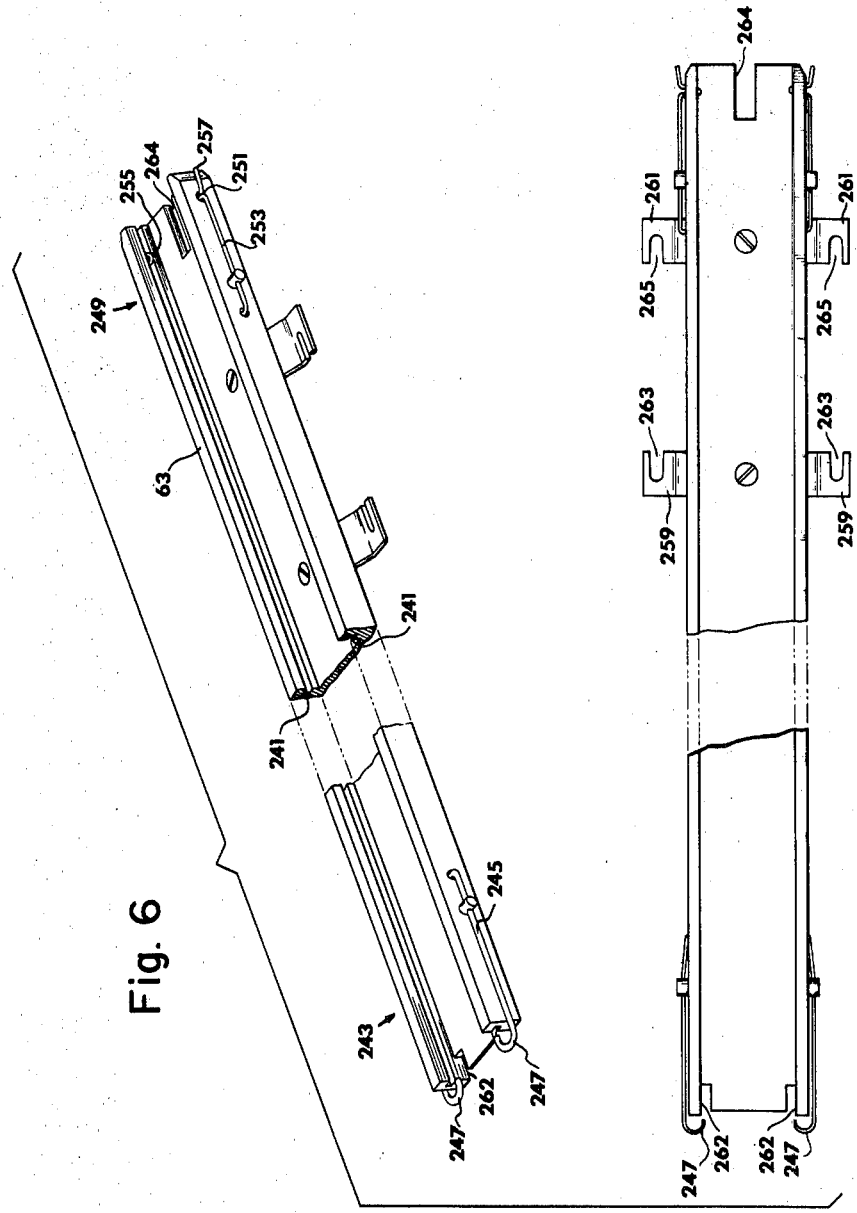

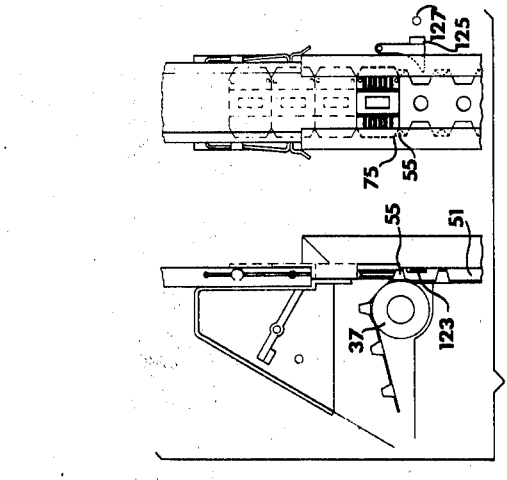
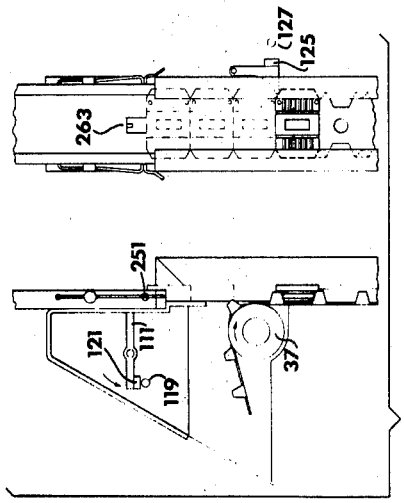
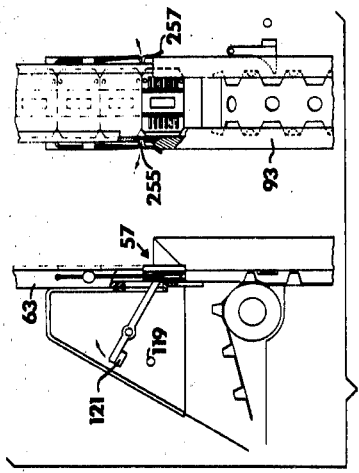
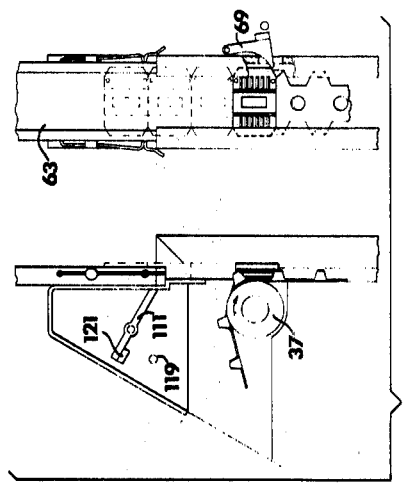
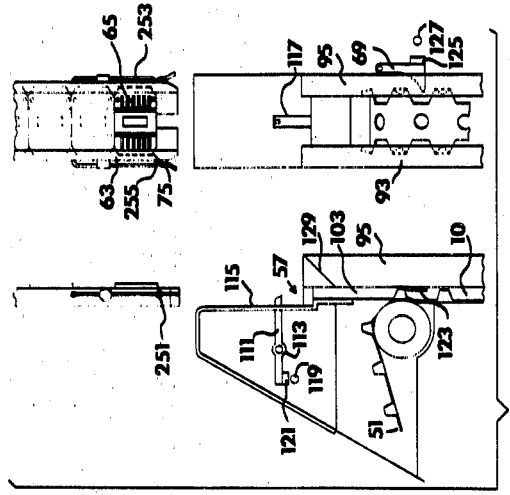
Robert B. Ryan
August A. Zachmeier
Hans D. Heyck
Robert E. Garman
INVENTOR.

Robert B. Ryan
August A. Zachmeier
Hans D. Heyck
Robert E. Garman
INVENTOR.

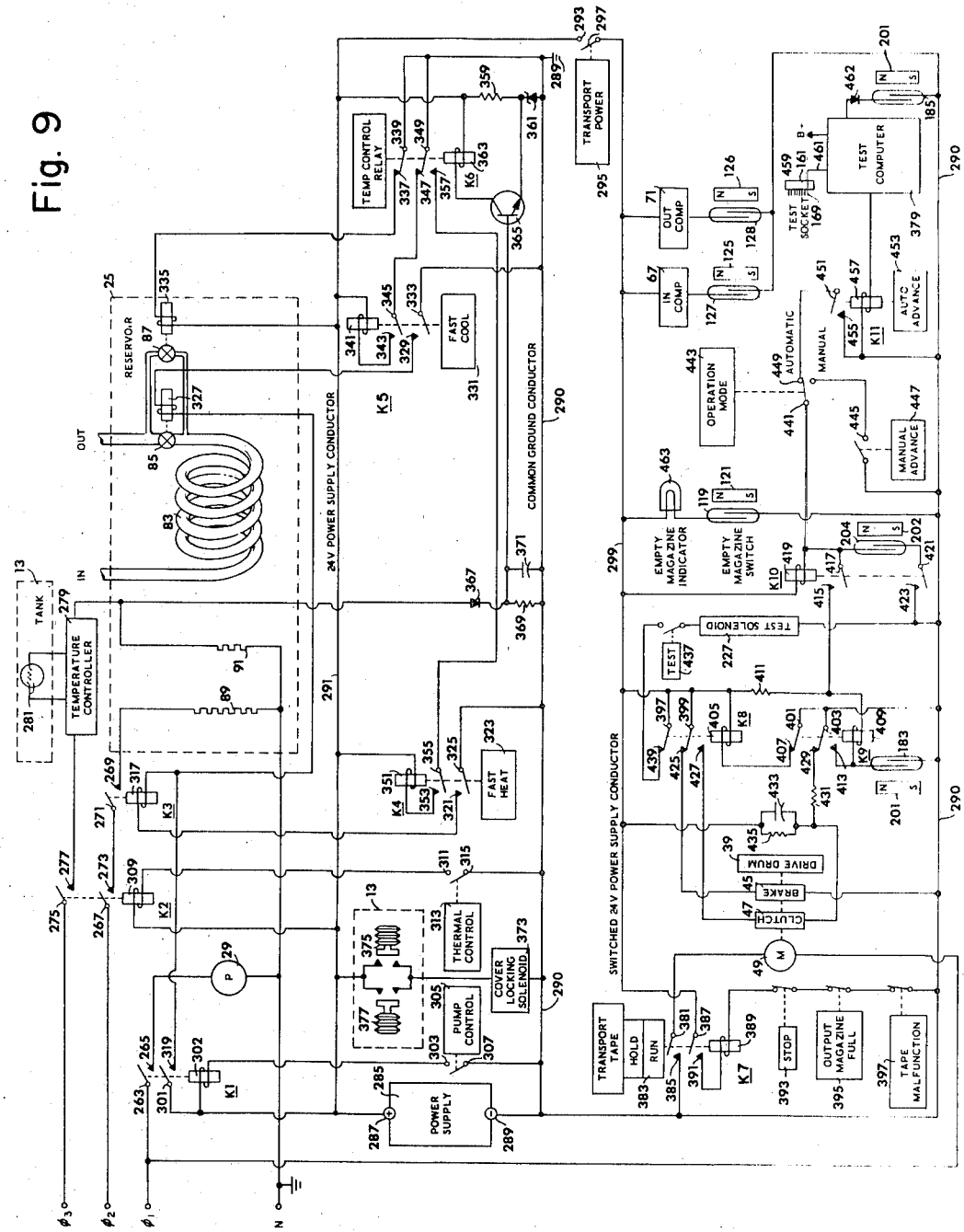

United States Patent Office 3,560,849
Patented Feb. 2, 1971

3,560,849
LIQUID TEMPERATURE CONTROLLED TEST CHAMBER AND TRANSPORT APPARATUS FOR ELECTRICAL CIRCUIT ASSEMBLIES
Robert B. Ryan, Timonium, August A. Zachmeier, Joppa, and Hans D. Heyck, Phoenix, Md., and Robert E. Garman, York, Pa., assignors to AAI Corporation, Cockeysville, Md., a corporation of Maryland
Filed Aug. 15, 1967, Ser. No. 660,673
Int. Cl. G01r 15/12
U.S. Cl. 324—73    27 Claims

ABSTRACT OF THE DISCLOSURE

An environmental test chamber and transport apparatus is disclosed for automatically testing a plurality of packaged integrated circuits. A plurality of packaged integrated circuits are fed from a loaded input magazine onto a transport tape which moves into a non-conductive, temperature controlled, liquid bath and then into a test assembly which is submerged in the bath. As each packaged integrated circuit moves into the test assembly, its presence is detected and, when it is properly positioned, movement of the transport tape is stopped. Next, the particular packaged integrated circuit in the test assembly is removed from the transport tape and pressed against a test socket having a plurality of protruding contacts which engage the exposed terminals of the packaged integrated circuit whereupon a series of programmed tests are performed to determine the electrical characteristics of the packaged integrated circuits. When the tests are completed, the packaged integrated circuit is placed back on the transport tape whereupon movement of the transport tape again commences which carries the packaged integrated circuits out of the bath and feeds them into an output magazine.

---

This invention relates to apparatus for automatically testing a plurality of packaged integrated circuits in a controlled temperature environment.

In the past, various machines have been devised for testing integrated circuits, however none have been entirely satisfactory. In one type of apparatus, a machine is loaded with a limited number of packaged integrated circuits and placed into an oven that is heated or cooled to a desired temperature, whereupon a series of tests are performed. After the tests are completed, the apparatus is removed from the oven, and the tested integrated circuits are removed from the machine which is thereupon reloaded and placed back into the oven. This arrangement is undesirable because only a limited number of integrated circuits can be tested in one loading of the oven and there is an undue loss of time in the loading and unloading operations as well as the time required to adjust the temperature in the oven.

In the past, apparatus has been used to test integrated circuits wherein a plurality of integrated circuits were moved through a temperature controlled air chamber wherein they were tested and removed. However, in this apparatus, the integrated circuit packages push against each other in order to afford movement of the integrated circuits through the testing chamber. This arrangement is undesirable because it requires the machine to be fully loaded before a single integrated circuit can be tested. In addition, if cold air is used to lower the temperature of the packaged integrated circuits to the desired temperature at which the test is to be performed, then the cold air will tend to form frost upon the incoming integrated circuits which interferes with the testing operation.

Accordingly, it is a feature of this invention to provide an environmental test chamber for testing packaged integrated circuits at any selected controlled temperature within a given temperature range and to provide apparatus which is adapted to accommodate any number of packaged integrated circuits and continually process them through the environmental test chamber.

In accordance with the present invention, there is provided an environmental test chamber adapted to contain a bath of non-conductive, temperature-controlled liquid and having an endless transport tape continuously moving into a liquid temperature-controlled bath, through a submerged test assembly having a test socket and back out of the liquid bath. The apparatus is adapted to continuously receive packaged integrated circuits onto the transport tape and carry them to the test assembly, whereupon movement of the transport tape will be stopped. Each packaged integrated circuit will, in turn, be laterally removed from the transport tape and laterally pressed against a test socket whereupon a test or a series of programmed tests can be performed, as desired, to determine the electrical characteristics of the integrated circuits. After the testing is completed, each packaged integrated circuit will be laterally moved back onto the transport tape and the forward movement of the transport tape will be resumed until each packaged integrated circuit is removed from the temperature-controlled bath and discharged from the apparatus.

Still other objects, features, and attendant advantages will become apparent to those skilled in the art from a reading of the following detailed description of a preferred physical embodiment constructed in accordance with the invention, taken in conjunction with the accompanying drawings, wherein:

FIG. 1 is a schematic orthographic illustration of an environmental test chamber and transport apparatus for testing a plurality of packaged integrated circuits, according to the invention.

FIG. 4 is a cut-away view of the apparatus at the inlet end of the tank which in the illustrated embodiment forms the discharge section of the apparatus from which the packaged integrated circuits are ejected.

FIGS. 5a–5g illustrate the construction of the test assembly and the series of movements which it undergoes in laterally removing a packaged integrated circuit from the transport tape, pressing it against the test socket, and then withdrawing it from the test socket and placing it back onto the transport tape.

FIG. 6 shows a magazine according to the invention and adapted to contain a plurality of packaged integrated circuits and having one end with a stop spring to normally retain the packaged integrated circuits in the magazine and the other end with a control spring which permits only unidirectional movement into the magazine.

FIGS. 7a–7e illustrate schematically the manner in which a packaged integrated circuit is fed from a loaded magazine into the input section of the apparatus and onto the transport tape.

FIG. 9 is a circuit schematic of a control system adapted to control the temperature of the non-conductive liquid bath and the movement of the transport tape and the test assembly.

Figure 2:
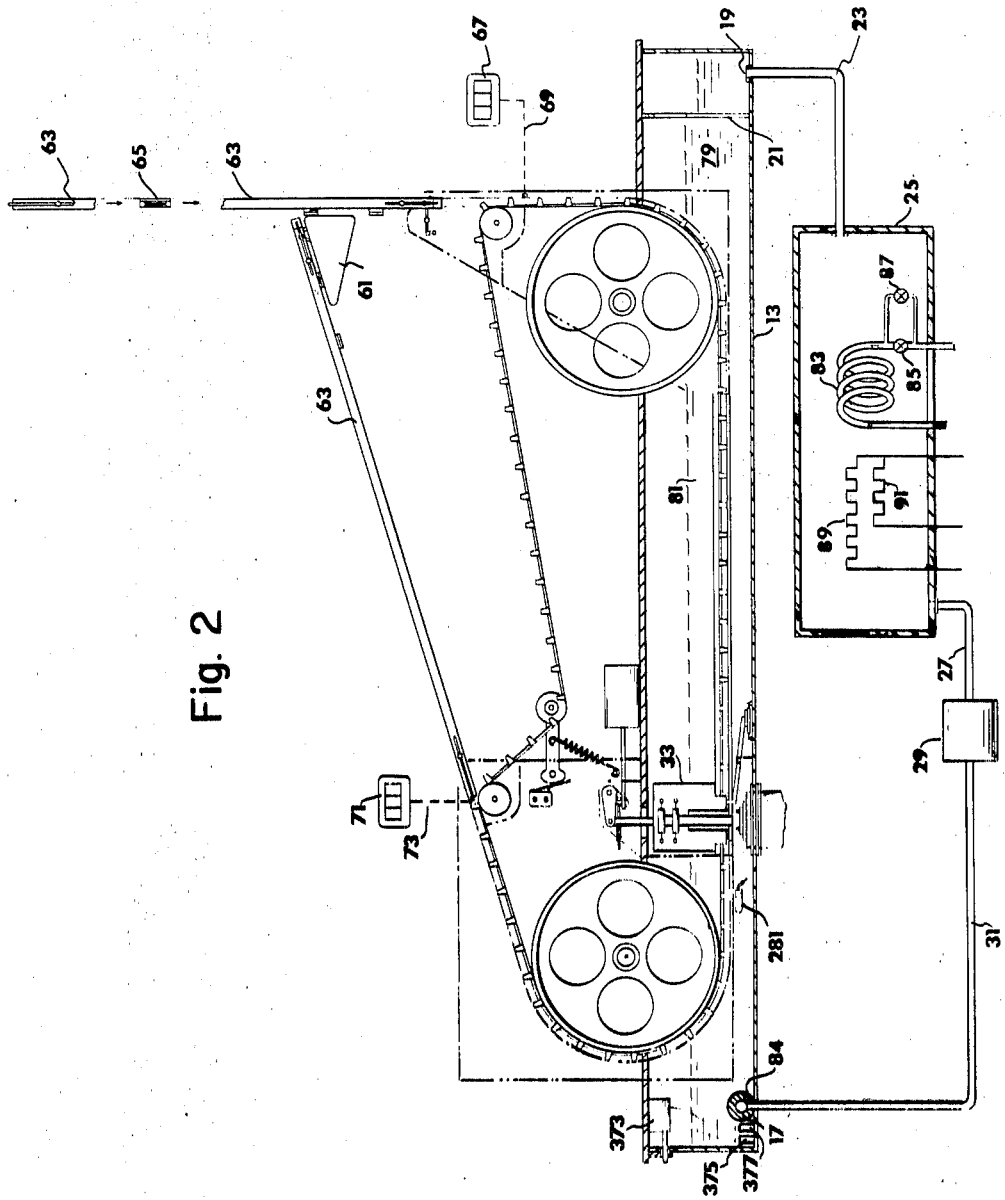
FIG. 2 is a schematic side view of the environmental test chamber showing the manner in which the temperature of the non-conductive liquid bath is controlled.

Referring now in detail to the figures of the drawings, in

FIG. 1 is shown schematically an apparatus, generally indicated at 11, embodying the principles of the present invention. The apparatus 11 generally consists of a tank 13 adapted to hold a fluid bath and having a fluid inlet 15 at one end of the tank with a fluid distributing head 17 attached thereto, a drain 19 at the opposite end of the tank, and a slotted weir 21 mounted therebetween at the opposite end of the tank 13 for controlling the level of a fluid bath in the tank 13. The fluid bath may be a suitable non-conductive, substantially non-reactive, low-residue fluid having a wide liquid temperature range of approximately —55° C. to +150° C. and may preferably be a fluorocarbon compound such as Freon E3 or Freon E4 or a mixture thereof.

Exterior to the tank 13 and connected to the drain 19 by a conduit 23 is a temperature-controlled fluid reservoir 25 which, in turn, is connected by a conduit 27 to a pump 29. The pump 29 is connected by a conduit 31 to the fluid inlet 15 and distributing head 17 of the tank 13 for supplying temperature controlled fluid to the tank 13 during the operation of the environmental test apparatus 11. Mounted inside the tank 13 and adapted to be partially submerged by the non-conductive temperature-controlled fluid contained in the tank 13 during the operation of the apparatus 11 is a test assembly, generally indicated at 33, which is adapted to receive a packaged integrated circuit and enable a test or a series of tests to be performed on it.

Mounted on the drain end of the tank 13 between the test assembly 33 and the fluid level limiter 21 is an idler drum 35 and an idler wheel 37, the latter being mounted above the idler drum 35. Mounted at the inlet end of the tank 13 and above the fluid distributing head 17 is a drive drum 39, an idler wheel 41 and a tension idler wheel 43. The drive drum 39 is connected through an electrically actuated clutch 47 and brake 45 to a continuously running electric motor 49. The idler wheel 41 is mounted above the drive drum 39, and the tension idler wheel 43 is mounted slightly beneath the idler wheel 41 and toward the drain end of the tank 13.

A unitary, continuous, transport tape, generally indicated at 51, is formed with a series of integral, spaced lateral protrusions 53, which are bent and folded to form upwardly protruding ears, generally indicated at 55, adapted to hold packaged integrated circuits therebetween. The transport tape 51 is wrapped around the various wheels and drums so as to move over the idler wheel 37 at the drain end of the tank 13, down and under the idler drum 35, along the bottom of the tank 13, through the test assembly 33, under and around the drive drum 39, up and over the idler wheel 41 located at the inlet end of the tank 13, under the tension idler 43 and back to the idler wheel 37 at the drain end of the tank 13.

The idler wheel 37 at the drain end of the tank forms an input section, generally indicated at 57, of the apparatus 11 into which packaged integrated circuits are fed onto the transport tape 51. The idler wheel 41 at the inlet end of the tank forms a discharge section, generally indicated at 59, of the apparatus 11 at which packaged integrated circuits are ejected from the transport tape 51.

Above the input section 57 of the apparatus 11 is a bracket 61, supported by any suitable means, onto which a magazine, generally indicated at 63, loaded with packaged integrated circuits, generally indicated at 65, is attached so that the packaged integrated circuits may be gravity fed through the input section 57 and onto the transport tape 51.

A counter 67, actuated by the movement of an arm, generally indicated at 69, extending into the input section 57, is adapted to count the number of packaged integrated circuits being fed onto the transport tape 51. Attached to the same bracket 61 but in a position to receive tested packaged integrated circuits being ejected from the discharge section 59 of the apparatus 11 is an empty magazine 63. Another counter 71, actuated by the movement of an arm, generally indicated at 73, extending into the discharge section 59, is adapted to count the number of packaged integrated circuits being ejected from the apparatus 11 into the empty magazine 63.

On the transport tape 51 near the discharge section 59 is a typical conventional carrier-packaged flat pack type integrated circuit assembly, generally indicated at 65, which may be transported, temperature-conditioned and tested according to the invention, and wherein the carrier package assembly has a generally rectangular configuration with beveled corners 75 and laterally protruding lugs 77 on each side and a pair of holes 78 on one side. The flat pack type integrated circuit arrangement 65 is mounted in such a manner that the connecting terminals 80 of the flat pack circuit are disposed in an exposed position between separator guides 82 on one surface of the carrier package assembly. The overall carrier package assembly, including the integrated circuit arrangement 86 carried thereby, is generally referred to herein as a packaged integrated circuit, and it will be understood that testing is to be accomplished on the circuitry (not shown) contained within the assembly, by external, electrical contact with the exposed electrical terminals 80.

In FIG. 2 is shown a cut-away view of the apparatus 11 illustrating the manner in which the temperature of a packaged integrated circuit is controlled for the purpose of testing it at a predetermined temperature. In this figure, a non-conductive liquid 79, such as Freon E3, is pumped from the reservoir 25 into the tank 13 at a selected rate to provide a bath 81 having a desired steady state level encompassing the relatively long, temperature-conditioning and stabilizing horizontal path of the transport tape 51 and at which the volume of the liquid 79 being pumped through the distributing head 17 into the tank 13 equals the volume of liquid 79 flowing through the slotted weir 21 and into the drain 19 in the opposite end of the tank 13. The level of the liquid bath 81 is such that the relatively long horizontal temperature-conditioning and stabilizing run of the transport tape and the test zone of the test assembly 33 are submerged in the bath 81. The use of the slotted weir 21 to control the level of the bath 81 is desirable because it permits the liquid 79 to flow along the bottom of the tank 13 past the test assembly 33 and the relatively long temperature-conditioning and stabilizing horizontal path of the transport tape 51 to closely control the temperature thereof which would be very difficult if the liquid 79 was stagnant at the bottom of the bath 81. The distributing head 17 has a plurality of lateral apertures, generally indicated at 84, opening towards the drain end of the tank 13 so as to provide a laminar flow of liquid 79 past the test assembly 33 to the drain end of the tank 13. A laminar flow of liquid 79 along the bottom of the tank 13 is desirable because it does not interfere with the general alignment of the packaged integrated circuits while on the transport tape 51 and in the test assembly 33. The temperature of the non-conductive liquid 79 in the reservoir 25 is varied by a cooling coil 83 having a fast cool valve 85 for the purpose of permitting a large quantity of coolant, e.g. liquid nitrogen, to pass through the cooling coil to rapidly cool the non-conductive liquid 79 to a predetermined low temperature, and a slow cool valve 87 to permit only a small quantity of coolant to pass through the cooling coil 83 and thereby provide a very accurate and closely controlled cooling of the liquid 79. Also contained inside the reservoir are two heating elements, 89 and 91, one of which is a fast heating element 89 for the purpose of rapidly heating the non-conductive liquid 79 and the other of which is a slow heating element 91 for the purpose of providing a closely controlled rate of heating. The manner in which these various heating and cooling elements are controlled will be discussed in connection with FIG. 9 which shows the electrical control circuitry for the apparatus 11.

Figure 3:
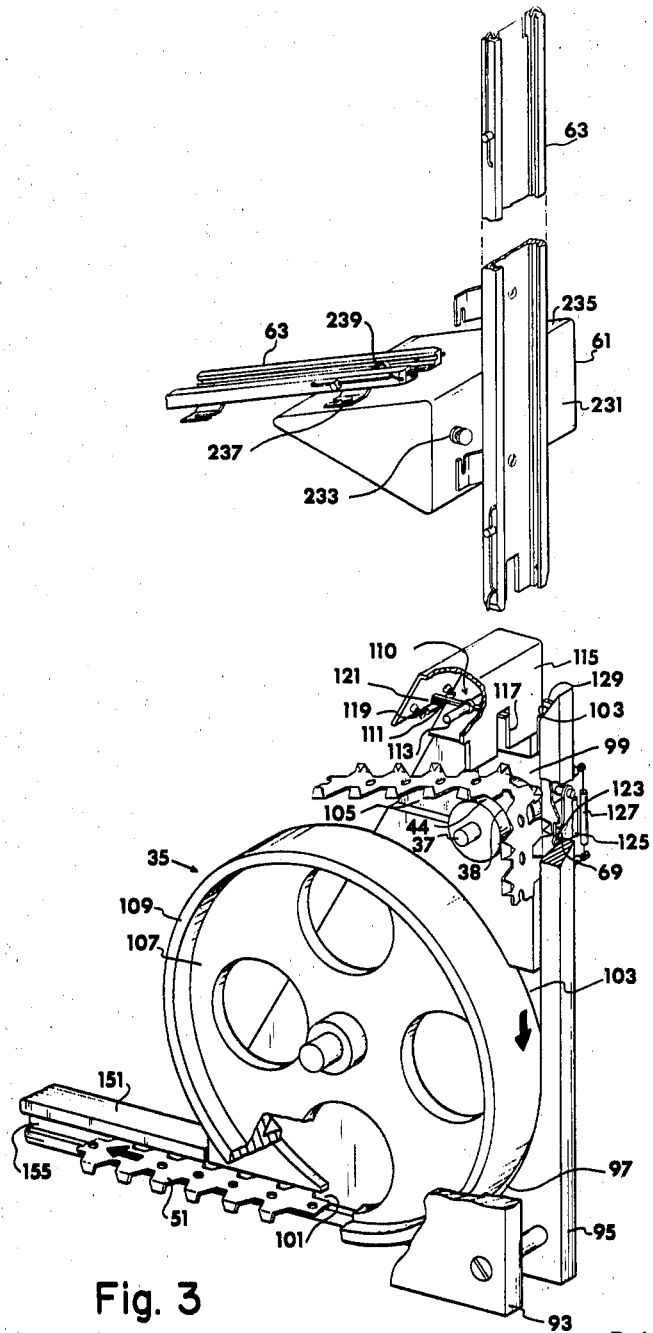
FIG. 3 is a cut-away view of the apparatus at the drain end of the tank which in the illustrated embodiment forms the input section of the apparatus into which the packaged integrated circuits are inserted.

In FIGS. 3 and 4 is illustrated the details of the tape transport assembly. In FIG. 3 is shown a cut-away view of the section of the tape transport assembly located at the outlet end of the tank 11. This section includes a pair of parallel side guide and support plates, generally indicated at 93 and 95, having grooved recesses with a configuration adapted to contain the idler drum 35, and the idler wheel 37 for the transport tape 51. For clarity of illustration, only a small portion of one of the plates 93 is shown, as the remainder of the plate 93 may suitably be and is preferably formed as the mirror image of the more fully illustrated plate 95. The plate 95 has a large diameter recess 97 in the lower portion thereof and a small diameter recess 99 located in the upper portion of the plate 95. A narrow horizontal groove 101 extends along the bottom edge of the plate 95 and tangentially intersects the large diameter recess 97. A narrow vertical groove 103 extends along the right-hand edge of the plate 95 and tangentially intersects both the small diameter recess 99 and the large diameter recess 97. In addition, there is a wide groove 105 sloping upwardly from the left-hand edge of the plate which tangentially intersects the small diameter recess 99. The idler drum, generally indicated at 35, including a disc 107 with a flat rim 109 perpendicularly attached to the periphery thereof is rotatably mounted between the plates 93 and 95 with the rim 109 extending into the large diameter recess 97. Above the idler drum 35, the idler wheel 37, having a circumferential recess 38, is rotatably mounted between the plates 93 and 95 in the small diameter recess 99.

Above the idler wheel 37 is an empty magazine sensor, generally indicated at 110, having an arm 111 which is pivotally mounted on a shaft 113 between the two plates 93 and 95. A cover 115 is mounted on top of the plates 93 and 95 to protect the pivotally mounted arm 111 from damage during operation of the machine. The portion of the cover 115 facing the outlet end of the tank 13 has a vertically extending slot 117 through which one end of the arm 111 protrudes. Mounted outside the cover 115 is a reed switch 119 which is adapted to close a circuit which will energize a lamp to indicate an empty magazine in the input section of the apparatus 11. Attached to the end of the pivotally mounted arm 111 is a magnet 121 which is normally in proximity with the reed switch 119 so as to close it. Between the idler wheel 37 and the idler drum 35 in the vertically extending groove is an opening 123 through which extends the finger of an arm 69, associated with a counter 67, which is pivotally mounted on the exterior of the plate 95. Attached to the arm 69 is a magnet 125 which is adapted to be moved into proximity with the reed switch 127 which is electrically connected with the counter 67 so as to actuate the counter and register the passage of a packaged integrated circuit. At the top of the right-hand edge of the parallel plate 95 is a bevel 129 which slopes inwardly to the vertically extending groove 103 so as to form an input section 57 for the packaged integrated circuits which are to be processed by the apparatus 11.

In FIG. 4 is shown a cut-away view of the portion of the tape transport assembly located at the inlet end of the tank 13. This portion includes another pair of guide and support parallel plates 131 and 133. For clarity of illustration, only a small fraction of the plate 133 is shown, as the remainder of the plate 133 may suitably be formed as a mirror image of the more fully illustrated plate 131. Each plate has a large diameter recess 135 in the lower portion thereof with a smaller diameter recess 137 in the upper right-hand portion thereof. A narrow groove 138 extends horizontally along the bottom edge of the plate 131 and tangentially intersects the large diameter recess 135. A narrow groove 139 tangentially intersects the upper portion of the large diameter recess 135 and slopes upwardly to tangentially intersect the upper portion of the small diameter recess 137. Tangentially intersecting the upper portion of the small diameter recess is a narrow groove 141 which slopes downwardly to the right-hand edge of the plate. Rotatably mounted between the parallel plates 131 and 133 is a drive drum, generally indicated at 39, having a disc 143 and a flat rim 145 perpendicularly attached to the periphery thereof and extending into the circular groove 135 of the plates 131 and 133. The drive drum 39 is mechanically connected through the electrically actuated brake 45 and clutch 47 to the continuously running electrical motor 49. Also rotatably mounted between the plates 131 and 133 is a small diameter idler wheel 41, having a circumferential recess 42, which extends into the small diameter recess 137. The intersection between the upwardly sloping groove 139 and the downwardly sloping groove 141 at the point where the small diameter idler wheel 41 extends into the circular recess 137, forms a discharge section 59 from which the tested packaged integrated circuits are ejected from the appartus 11. Pivotally mounted on the right-hand side of the plates 131 and 133 are a pair of arms 146 and 147 having a small diameter idler wheel 43 rotatably mounted therebetween. This idler wheel 43 is resiliently biased downward by a tension spring 149 attached to the plates at one end and to the pivotally mounted arms at the opposite end. A cam 148 is formed on the end of the arm 146 pivotally mounted on the plate 131 which engages the actuating portion of a Tape Malfunction switch which may suitably be an over-center toggle action switch, such as a microswitch, and serves to halt the movement of the transport tape 51 if the apparatus 11 should become jammed or the tension exerted by the spring 149 on the small diameter idler wheel 43 should diminish so as to pivot the arm 146 thereby causing the cam to actuate the Tape Malfunction switch 397.

Connecting the bottom edges of the plates 93 and 95 at the drain end of the tank 13 and the plates 131 and 135 at the inlet end of the tank 13 are a pair of guide plates 151 and 153 having a slot therein extending throughout the length of the plates 151 and 153 which is aligned with the narrow horizontal grooves 101 and 138 at the bottom edge of the plates 93, 95, 131 and 133 at both ends of the tank 13. The guide plates 151 and 153 have a cut-out section, generally indicated at 159, which is adapted for installation of the test assembly 33 thereto.

The transport tape 51 is threaded into the upwardly sloping groove 105 of the parallel plates 93 and 95 at the drain end of the tank 13, over the idler wheel 37, down through the narrow vertically extending groove 103 at the right-hand edge of the plates, under the rim 109, of the idler drum 35, through the narrow horizontally extending groove 101 along the bottom edge of the plates, into the slots 155 and 157 of the guide plates 151 and 153 to the narrow horizontally extending groove 138 at the bottom edge of the parallel plates 131 and 133 at the inlet end of the tank 13, under the rim 145 of the drive drum 39, into the narrow upwardly sloping groove 139, over the idler wheel 41, into the narrow downwardly sloping groove 141, under the resiliently biased tensioning idler wheel 43 and back to the other pair of parallel plates 93 and 95 at the drain end of the tank 13. The transport tape 51 is maintained in proper alignment along its path of travel by the engagement of the tape with the circumferential recesses 38 and 42 of the idler wheels 37 and 41 respectively. When the tape 51 is placed under tension by the resiliently biased tensioning idler wheel 43 the laterally protruding ears of the transport tape engage the larger diameter circumferential end portions 44 and 46 of the idler wheels 37 and 41 while the narrow portion of the tape extends into and engages the grooved circumferential recesses 38 and 42 of the wheels 37 and 41 thereby aligning the tape on the idler wheels and consequently preventing it from tending to shift its position on the drums.

In FIG. 5a is illustrated the construction of the test assembly, generally indicated at 33, which is mounted inside the tank 13 at the open section 159 of the guide plates 151 and 153. The test assembly 33 includes a test socket 161 suitably mounted in fluid sealing relation in the bottom wall of the tank 13 and a housing, generally indicated at 163, positioned in vertical alignment with the open, cut-out section 159 of the guide plates 151 and 153. The test socket 161 is mounted in the bottom of the tank 13 beneath the open, cut-out section of the guide plates 151 and 153. The top of the test socket 161 has a pair of upwardly protruding parallel rails 165 and 167 extending thereacross in the direction of the guide plates 151 and 153 and which are spaced sufficiently apart and have a sufficient height to accommodate a packaged integrated circuit therebetween. In each rail 165 and 167 and protruding through the surface thereof are a plurality of upwardly extending and resiliently biased contact pins, generally indicated at 169, properly positioned to register with and engage the downwardly exposed terminals 80 of the packaged integrated circuits. A pair of guide pins 170 are attached to the rail 165 to engage the holes 78 in a packaged integrated circuit so as to properly position it against the test socket 161. The contact pins 169 are connected by lead wires, not shown, through the fluid sealed test socket 161 to a testing computer whereby voltages and currents of varying magnitudes can be applied to determine the electrical properties of a packaged integrated circuit properly positioned and pressed against the contact pins 169. The housing, generally indicated at 163, is mounted on top of the guide plates 151 and 153 and has a top 171 and two sides 173 and 175 which partially extend into the open, cut-out section 159 of the guide plates 151 and 153. The top 171 of the housing 163 has a hole 177 adapted for a rod to be inserted therethrough. In each side 173 and 175 of the housing 163 is an upwardly extending slot, only one of which 179 is shown, which serve as a vertical guide for a U-shaped bracket 181 contained inside the housing 163 of the test assembly 33. Mounted on one side of the housing 163 and spaced a short vertical distance apart are a pair of magnetically actuated reed switches 183 and 185 which are connected in controlling relationship to the brake and clutch circuits illustrated in FIG. 9. The U-shaped bracket 181 extends through the vertical slots 179 in each side 173 and 175 of the housing 163 and has a flange 187 on the outside edge thereof to insure proper horizontal alignment with the housing 163. On the bottom of each end of the U-shaped bracket 181 is an inwardly extending foot 189 and 191 having a channel 193 formed therein which is adapted to engage the lug on the edge of a packaged integrated circuit. Pivotally connected to the bottom of each inwardly extending foot 189 and 191 and resiliently biased upward is a shoe assembly 195 and 197. The shoe assembly 195 on the foot 191 has an arm 199 integrally connected thereto which extends upwardly in the direction of the reed switches 183 and 185 mounted on the side of the housing 175. Attached to the end of the arm 199 is a small magnet 201 which normally closes the reed switch 183, and causes it to open when the pivotal movement of the shoe assembly 195 causes the arm 199 to move the magnet 201 out of actuating proximity with the reed switch 183. Pivotally connected to the other foot 189 of the U-shaped bracket 181 is a shoe assembly 197 which is resiliently biased in an upward direction against the bottom foot 189. Each shoe assembly 195 and 197 extends inwardly and has upwardly protruding nipples 203–209 on each side. Mounted inside the U-shaped bracket 181 is a clevis 211 having a vertical length slightly less than that of the U-shaped bracket 181. Fastened to the clevis 211 is a rod 213 having a slot 215 therein which is adapted to contain the horizontally extending portions of the U-shaped bracket 181 and the clevis 211. The slot 215 is deep enough to provide a gap between the top of the U-shaped bracket 181 and the innermost portion of the slot 215. The opposite end of the rod 213 is bifurcated and pivotally connected to an arm 217 which in turn is pivotally connected to a cam 219 which is rotatably connected through a bearing 221 to another cam 223 which is pivotally connected to a bifurcated end of a plunger 225 of a solenoid 227. The clevis and U-shaped bracket are resiliently biased upwardly by a spring 229 which engages the cam 223 to which the plunger 225 is pivotally connected. Immediately in front of the shoe assembly 195 is an upwardly protruding finger 196 of a pivotally mounted arm 198 of an incoming packaged integrated circuit sensor 200. Attached to the opposite end of the arm 198 is a magnet 202 which is normally in proximity with the reed switch 204 so as to close it, but is pivoted out of proximity by an incoming packaged integrated circuit which engages the upwardly protruding finger 196.

In FIG. 5b the packaged integrated circuit is shown moving into the test assembly 33. A forward beveled corner 75 of a laterally extending lug 77 of an incoming packaged integrated circuit 65 is shown engaging the upwardly protruding finger 196 of the arm 198 of the incoming packaged integrated circuit sensor 200 which causes the arm 198 to pivot and bring the magnet 202 out of proximity with the reed switch 204. In addition, and substantially simultaneously therewith, the beveled edges 75 engage the first pair of protruding nipples 203 and 207 of the shoe assemblies 195 and 197 pivotally attached to the feet 191 and 193 of the U-shaped bracket 181. Further longitudinal movement of the packaged integrated circuit 65 by the transport tape causes the shoe assembly 195 to be pressed downward thereby causing the magnet 201 attached to the arm 198 to move out of proximity with the uppermost reed switch 183 mounted externally on the side 175 of the housing 163.

In FIG. 5c the packaged integrated circuit 65 is moved further into the test assembly 33 until it no longer engages the upwardly protruding finger 196 of the incoming packaged integrated circuit sensor 200 thereby permitting the magnet 202 attached to the arm 198 to move into proximity with the reed switch 204 so as to close it. Furthermore, the incoming packaged integrated circuit no longer depresses the resiliently biased shoe assembly 195 downward so the magnet 201 attached to the arm 199 is brought back into proximity with the uppermost reed switch 183 so as to close it. The closing of the reed switch 183 results in the clutch 47 being de-actuated and the brake 45 being actuated to stop the movement of the transport tape 51 as will be more fully described in the discussion of FIG. 9.

The solenoid 227 is actuated as shown in FIG. 5d so as to cause the rod 213 to move downward thereby forcing the clevis 211 downward until it engages the inwardly extending feet 189 and 191 on the bottom of each end of the U-shaped bracket 181, thereby causing it to also move downward. The downward movement of the U-shaped bracket moves the magnet 201 attached to the arm 199 out of proximity with the upper reed switch 183, thereby causing it to open, and into proximity with the lower reed switch 185, thereby causing it to close.

As shown in FIG. 5e, the downward movement of the slotted rod 213 causes the guide pins 170 attached to the test socket 161 to engage the holes 78 in one side in the packaged integrated circuit 65 and further causes the exposed terminals 80 of the packaged integrated circuit 65 to engage the upwardly protruding and resiliently biased contact pins 169 which thereupon resist further downward movement of the packaged integrated circuit 65 until the clevis 211 engages the back side of the packaged integrated circuit 65 and firmly presses the packaged integrated circuit 65 onto the test socket 161.

As shown in FIG. 5f, the upward movement of the slotted rod 213 causes the clevis 211 to move upward and engage the U-shaped bracket 181 whereupon both the clevis 211 and the U-shaped bracket 181 are moved upwardly causing the packaged integrated circuit to be lifted from the test socket 161 and placed back into position for movement onto the transport tape 51. In addition, the upward movement of the U-shaped bracket 181 again brings the magnet 201 attached to the arm 199 into proximity with the upper reed switch 183 so as to close it.

When the movement of the transport tape 51 is again resumed, the packaged integrated circuit will begin to move out of the test assembly 33 and engage the other pair of protruding nipples 205 and 209 on the shoe assemblies 195 and 197, thereby again depressing the shoe assemblies 195 and 197 so as to again move the magnet 201 attached to the arm 199 out of proximity with the upper reed switch 183, and causing it to open. After the packaged integrated circuit moves still further out of the test assembly 33, it no longer depresses the shoe assembly 195, and thus permits the magnet 201 attached on the arm 199 to move into proximity with the upper reed switch 183, so as to close it.

Above the parallel plates 93 and 95, as particularly illustrated in FIGS. 3 and 4, is a right-angled wedge-shaped member 61 which is attached to the apparatus by any suitable means. The wedge-shaped member 61 has a pair of protruding studs on the vertical side, only one of which is shown, 233, which are adapted to support a magazine 63 thereon in a position such that one end of the magazine 61 can extend into the narrow vertical grooves 103 of the plates 93 and 95, which form the input section 57 of the apparatus 11 and be in vertical alignment therewith, On the sloping side 235 of the wedge-shaped member 61 are another pair of supporting studs, only one of which is shown, 237, adapted to support a magazine 63 inserted into the narrow grooves slots 139 of the parallel plates 131 and 133 which form the discharge section 59 of the apparatus 11. Also protruding through the sloping side 235 of the wedge-shaped member 61 is the arm 239 of a normally closed switch adapted to stop the movement of the transport tape 51 when the magazine 63 inserted into the discharge section 59 of the apparatus 11 becomes fully loaded.

From the foregoing, it will be appreciated that it is desirable to have a container in the form of a magazine which is adapted to receive and aid in entrant movement thereinto of a plurality of packaged integrated circuits 63, ejected from the discharge section 59 of the apparatus 11, and normally retain them, yet also capable of feeding them onto the transport tape 51 when inserted into the input section 57 of the apparatus 11. A preferred embodiment of a magazine according to this aspect of the invention is shown in FIG. 6 which has a narrow groove 241 in each side and extending the full length of the magazine 63 to provide a guide for the laterally extending lugs 77 on each side of a packaged integrated circuit and further to hold the packaed integrated circuits in the magazine 63. At one end of magazine 63, which may be designated the input end, 243, and attached to each side thereof are a pair of control springs 245 which have a bend 247 at the end so as to permit only unidirectional movement of packaged integrated circuits into the magazine 63. At the opposite end of the magazine 63, which may be designated the output end 249, are a pair of apertures 251 which open into the grooves 241 in each side of the magazine 63. Attached to the output end 249 of the magazine 63 are a pair of stop springs 253 having a bend 255 which extends into the apertures 251 in the sides of the magazine and a free end 257 adapted to engage a portion of the plates 93 and 95 at the input section 57 into which the magazine is to be inserted so as to force the bend 255 in the springs 253 out of the apertures 251. Connected to the bottom of the magazine 63 are two pairs of feet 259 and 261 each having openings 263 and 265 facing towards each other. At the input end 243 of the magazine 63, the bottom of the magazine has notches 262 which permit the ears 55 on the transport tape 51 to pass therethrough when the input end 243 is placed close to the transport tape 51 in the discharge section 59 so that the bottom of the magazine can serve as a camming device to facilitate the entry of packaged integrated circuits into the magazine 63. At the output end 249 of the magazine 63, the sides of the magazine are beveled so as to facilitate insertion of the magazine 63 into the input section 57 of the apparatus 11. Furthermore, the bottom of the magazine 63 has a slot 264 to permit the arm 111 of the empty magazine sensor 110 to extend into the path of packaged integrated circuits being fed from the magazine into the input section 57 of the apparatus.

In FIGS. 7a–7e is illustrated the manner in which packaged integrated circuits from a loaded magazine 63 are fed onto the transport tape 51 at the input section 57 of the apparatus 11. Protruding through the slot 117 in the cover 115 is the pivotally connected arm 111 of the Empty Magazine Sensor with the magnet 121 attached thereto in proximity with the reed switch 119 so as to close it. Protruding through a hole in the narrow vertically extending groove 103 in the plate 95 is the finger of the pivotally connected arm 69 on which is attached a magnet 125 which serves to close the reed switch 127 to actuate the counter 67.

In FIG. 7a is shown a magazine 63 loaded with packaged integrated circuits and ready for insertion into the input section 57 of the apparatus 11. The packaged integrated circuits are retained in the magazine 63 by the bends 255 in the stop springs 253 which protrude through the apertures 251 in the sides of the magazine 63 and engage the beveled edges 75 of the leading packaged integrated circuit 65. The magnet 121 at the end of pivotally connected arm 111 is in close proximity with the reed switch so as to close it. The magnet 125, attached to the pivotally connected arm 69, is out of proximity with the reed switch 127 so that it remains open.

In FIG. 7b, the loaded magazine 63 is shown inserted into the input section 57 of the apparatus 11 so that the ends 257 of the springs 253 engage the sides of the plates 93 and 95 so as to spread the springs 253 apart and pull the bends 255 partly out of the apertures 251 in the sides of the magazine 63 to permit the packaged integrated circuits to fall from the magazine 63 into the narrow vertically extending slots 103 of the parallel plates 93 and 95 of the input section 57. The insertion of the loaded magazine into the input section 57 causes the leading packaged integrated circuit to engage the protruding end of the arm 111 thereby pivoting it and moving the magnet 121 out of proximity with the switch 119 so as to open it.

In FIG. 7c the downward movement of the packaged integrated circuits has continued until the beveled edge 75 of the leading packaged integrated circuit engages a pair of ears 55 of the moving transport tape 51, which halts the free falling downward movement of the packaged integrated circuits.

In FIG. 7d, the packaged integrated circuits are shown as having moved further downward as a result of the movement of the transport tape 51 until the next pair of ears 55 of the transport tape 51 are inserted into the gap between the beveled corners 75 of the adjacent packaged integrated circuits. In addition, the leading packaged integrated circuit is shown being driven further downward by the transport tape, causing one beveled corner to engage the finger of the pivotally connected arm 69 so as to move the magnet 125 into proximity with the reed switch 127, thereby closing it and actuating the counter 67.

In FIG. 7e, the packaged integrated circuits are shown as having moved still further downward as a result of the movement of the transport tape 51 until the leading packaged integrated circuit has moved past the protruding finger of the pivotally connected arm 69 so as to move the magnet 125 out of proximity with the reed switch 127, thereby opening the switch and permitting the counter 67 to reset in preparation for the sensing of another packaged integrated circuit. In addition, the last packaged integrated circuit has moved past the slot 263 in the bottom of the magazine 63, thereby permitting the arm 111 to pivot back to its normal position, bringing the magnet 121 into proximity with the reed switch 119 so as to close it and energize a lamp indicating that the magazine 63 is empty.

In FIGS. 8a-8d is illustrated the manner in which packaged integrated circuits are ejected from the transport tape 51 at the discharge section 59 of the apparatus 11 into an empty magazine 63. Protruding through a hole in the upwardly extending narrow groove 139 in the plate 131 is the finger of the pivotally connected arm 73 on which is attached a magnet 126 which serves to close the reed switch 128 to actuate the counter 71 each time the switch 128 is closed.

Figure 8B:
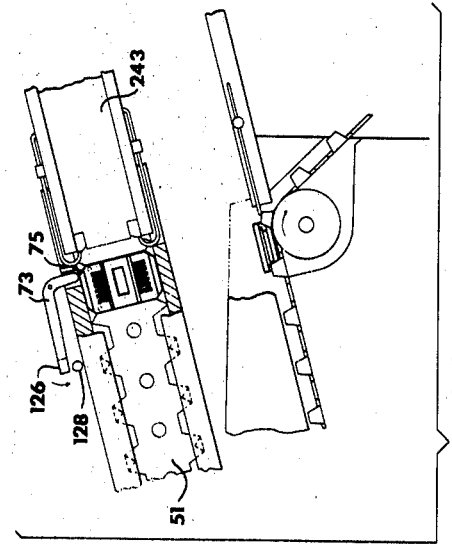
FIGS. 8a–8d illustrate schematically the manner in which a packaged integrated circuit is ejected from the discharge portion of the apparatus into an empty magazine.
Figure 8D:
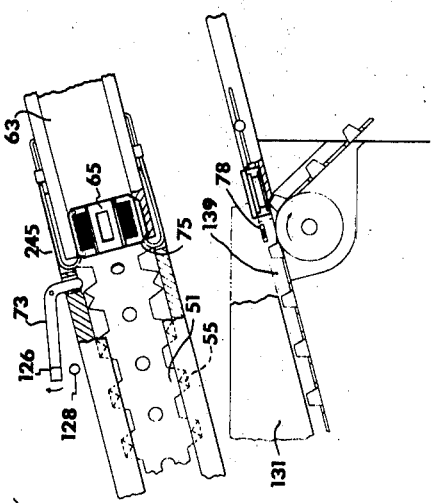
Figure 8A:
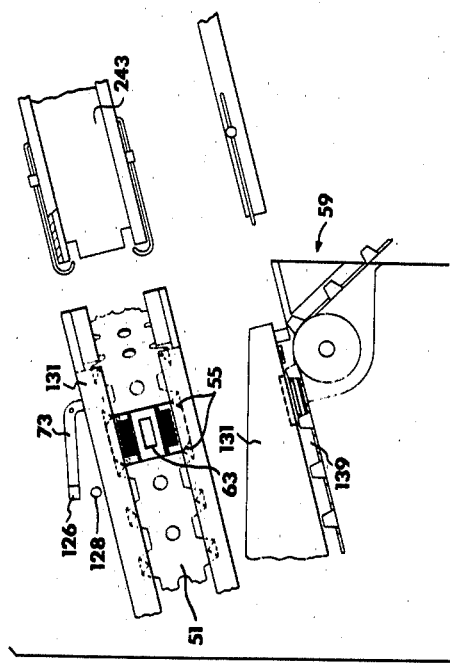

In FIG. 8a is shown the input end 243 of an empty magazine 63 ready for insertion into the discharge section 59 of the apparatus 11. A typical packaged integrated circuit is shown positioned between two pairs of ears 55 of the transport tape 51, which is moving upwardly on the narrow upwardly extending groove 139.

In FIG. 8b is shown the input end 243 of the magazine 63 inserted into the discharge section of the apparatus in a manner which enables the notched bottom to serve as a cam to scoop the packaged integrated circuits off the transport tape 51. In this figure, movement of the transport tape 51 has carried the packaged integrated circuit upwardly until the beveled corner 75 engages the finger of the pivotally connected arm 73 to cause the magnet 126 attached thereto to move into proximity with the reed switch 128 so as to close it and actuate the counter 71.

Figure 8C:
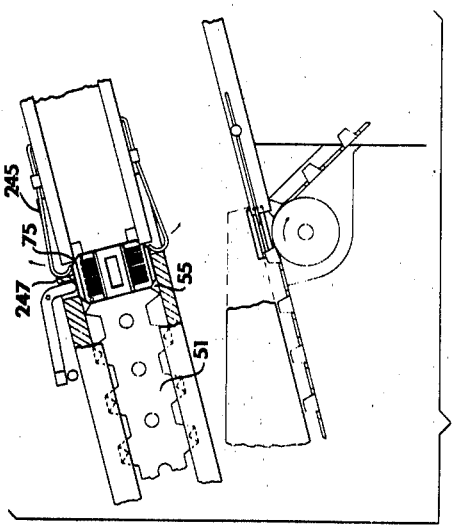

In FIG. 8c movement of the transport tape 51 has carried the packaged integrated circuit 65 further upward until the forward beveled corners 75 of the packaged integrated circuit engage the bends 247 in the springs 245 rigidly connected to each side of the magazine 63, thereby spreading them apart to permit the packaged integrated circuit to be pushed into the magazine by the ears 55 of the transport tape 51 which engage the beveled corners at the rearward end of the packaged integrated circuit.

In FIG. 8d, the ears 55 of the transport tape 51 engaging the rearward beveled corners 75 of the packaged integrated circuit 63 have pushed the packaged integrated circuit past the finger of the pivotally connected arm 73, which protrudes through the hole 78 in the upwardly extending groove 139 of the plate 131, thereby permitting the finger of the arm 73 to again extend into the path of the transport tape, causing the magnet 126 to be moved out of proximity with the reed switch 128, thereby opening the switch and permitting the counter 71 to reset in preparation for the sensing of another packaged integrated circuit moving through the discharge section 59 of the apparatus 11. As the ears 55 of the transport tape 51 pass through the notches in the bottom of the magazine 63, the ends of the springs 245 engage the beveled corners 75 at the rear of the packaged intergrated circuit 65 and close toward each other so as to pull the packaged integrated circuit entirely into the magazine 63. This sequence is repeated for each packaged integrated circuit being ejected from the discharge section 59 into the magazine 63 until the leading packaged integrated circuit in the magazine engages the arm of the Magazine Full Switch which protrudes from the wedge-shaped member 61 at the opposite end of the magazine so as to stop movement of the transport tape 51.

In FIG. 9 is shown the schematic of a control circuit according to the invention, for operating the apparatus 11 illustrated in the previous figures. For clarity of illustration the portions of the circuit relating to the thermal control of the non-conductive fluid 79 have been separated from the portions of the circuit relating to the movement of the tape transport and the test assembly. In the upper part of the drawing is the portion of the circuit relating to the thermal control system of the non-conductive liquid 79. Also in the upper part of the drawing and by schematically indicated broken lines is the liquid reservoir enclosure 25 which contains the heating elements 89 and 91 and the cooling coils 83. The power for operating the pump motor 29, the drive motor 49, and the fast heating element 89 and the slow heating element 91 is supplied from a three-phase source by three power lines illustrated respectively as $\phi_1$, $\phi_2$, and $\phi_3$, which have a common ground indicated by N.

The $\phi_1$ line is connected by normally open relay contact 263 and a terminal 265 of the relay K-1 to the pump motor 29. The $\phi_2$ line is connected by a normally open relay contact 267 and a terminal 273 of the relay K-2, which in turn is connected to a normally open relay contact 271 and a terminal 269 of the relay K-3 to the fast heating element 89. The $\phi_3$ line is connected by a normally open relay contact 275, which is mechanically connected to the relay contact 267, and a terminal 277 of the relay K-2 to a Temperature Controller 279 which in turn is connected to the slow heating element 91. Also connected to the Temperature Controller 279 is a temperature sensor 281 contained in the tank 13 near the test socket 161 which senses the temperature of the liquid flowing past the test socket 161 during the operation of the apparatus and accordingly controls the amount of power supplied by the Temperature Controller 279 to the slow heating element 91. The amount of coolant supplied to the cooling coils 83 is controlled by two solenoid-actuated valves 85 and 87. The first valve 85 permits a large amount of coolant to flow through the cooling coils 83 so as to produce a rapid cooling of the liquid 79 contained in the reservoir 25. The second valve 87, a slow cool valve, bypasses the fast cool valve 281 and permits only a small quantity of coolant to flow through the cooling coils 83 so as to produce a very slow and closely controlled rate of cooling of the non-conductive liquid 79 contained in the reservoir 25.

The power for the control circuitry which operates the various relays and solenoids is supplied from a standard, constant, 24-volt DC power supply 285 having positive and negative output terminals 287 and 289 respectively, the latter of which is connected to the common ground conductor 290. Connected to the positive terminals 287 of the 24-volt power supply is a conductor 291 which supplies the power for the thermal portion of the control circuitry. The conductor 291 is connected to a terminal 293 of a normally open switch 295 designated the Transport Power switch. Connected to the other terminal 299 of the normally open Transport Power switch 295 is a conductor 299 which supplies power to the portion of the control circuitry which controls the movement of the tape transport 51 and the test assembly 33.

Mechanically connected to the normally open relay contact 263, which connects the $\phi_1$ line to the pump motor 24, is another normally open relay contact 301 which is connected to the conductor 291. The coil 302 of the relay K-1 is connected between the conductor 291 and a terminal 303 of a normally open switch 305 designated Pump Control switch. The other terminal 307 of the Pump Control switch 305 is connected to the common ground conductor 290.

The coil 309 of the relay K-2 is connected between the conductor 291 and a terminal 311 of the normally open switch 313 designated Thermal Control switch. The other terminal 315 of the Thermal Control switch 313 is connected to the common ground conductor 290. The coil 317 of the relay K-3 is connected between a terminal 319 associated with the normally open relay contact 301 of the relay K-1 and a terminal 321 of a normally open, latching, push button switch designated Fast Heat 323. The other terminal 325 of the Fast Heat switch 323 is connected to the common ground conductor 290. The coil 327 of the solenoid-actuated Fast Cool Valve 85 is connected between the terminal 319 of the relay K-1 and a terminal 329 of the normally open, latching, push button switch designated Fast Cool 331. The other terminal 333 of the Fast Cool switch is connected to the common ground conductor 290.

The coil 335 of the solenoid-actuated Slow Cool Valve 87 is connected between the conductor 291 and a terminal 337 of the temperature control relay K–6 which is connected by the relay contact 339 to the common ground conductor 290 when the relay is de-energized. The latching coil 341 of the Fast Cool switch 331 is connected between the conductor 291 and a terminal 343. The normally open contact 345 associated with the terminal 343 is mechanically connected to the relay contact 333 and electrically connected to a terminal 347 of the relay K–6 which is electrically and mechanically connected with the relay contact 339. The latching coil 351 of the Fast Heat switch 323 is connected between the conductor 291 and a terminal 353. The normally open contact 355 associated with the terminal 353 is connected to a terminal 357 of the relay K–6 which is associated with the relay contact 349. Connected in series across the conductor 291 and the common ground conductor 290 is a resistor 359 and a Zener diode 361 for providing a substantially constant reference voltage. Connected in series across the resistor 359 is the coil 363 of the temperature control relay K–6 and the collector-emitter path of an NPN transistor 365. Connected in series across the slow heat element 91 and the common ground conductor 290 is the anode cathode path of a diode 367 and a resistor 369. Connected in parallel across the resistor 369 is a capacitor 371. The base of the transistor 365 is connected to the junction between the diode 367 and the resistor 369. Also connected in series across the conductor 291 and the common ground conductor 290 are a cover-latching solenoid 373 and two normally open, parallel connected thermostats 375 and 377, both of which are located in the tank 13. One thermostat, 375, is set to close and thereby energize the cover-locking solenoid 373 when the temperature of the non-conductive fluid 79 contained in the tank 13 is decreased more than 20° C. below ambient temperature. The other thermostat, 377, is set to close and thereby energize the cover-locking solenoid 373 when the temperature of the non-conductive fluid 79 contained in the tank 13 is increased more than 20° C. above ambient temperature. This is a safety feature to prevent injury to the operator.

In the lower part of FIG. 9 is illustrated the portion of the control circuit related to the drive mechanism of the tape transport and the testing assembly 33 and related portions of a Test Computer, generally indicated at 379. In addition, the drive drum 39, brake 45, clutch 47, and continuously operating motor 49 are illustrated to show the relationship between the electrical control circuit and the mechanical apparatus illustrated in the preceding figures. The remainder of the control circuit is energized by a conductor 299 connected to the terminal 297 of the normally open Transport Power switch 295. The continuously operating motor 49 is connected, for purposes of illustration, between the $\phi_1$ power line and a terminal 381 of a normally open, latching, push button 383 designated Transport Tape Control. The other terminal 385 of the Transport Tape switch 383 is connected to the common ground conductor 290. The conductor 299 is connected to a normally open contact 387. A latching coil 389 is connected between a terminal 391 and the common ground conductor 290 by three serially-connected, normally closed switches. The first switch 393 is a Stop switch which the operator may use to stop the movement of the transport tape 51 at any time he chooses. The second switch 395 is designated Output Magazine Full switch which is located in the wedge-shaped member 61 and is used to stop the movement of the transport tape 51 when the magazine 63 inserted into the discharge section 59 of the apparatus 11 becomes fully loaded. The third switch 397 is designated Tape Malfunction switch and is associated with the tension idler and is used to stop the movement of the transport tape 51 if there should be some malfunction, such as a breakage of the tape or lessening of the tension on the tension idler wheel 43 between spring 149.

Connected to the conductor 299 are two electrically and mechanically connected relay contacts 397 and 399 of the relay K–8. Connected to the common ground conductor 290 are two electrically and mechanically connected relay contacts 401 and 403 of the relay K–9. The coil 405 of the relay K–8 is connected between the conductor 299 and a terminal 407 of the relay K–9 which is connected by the relay contact 401 to the common ground conductor 290 when the relay is de-energized. The coil 409 of the relay K–9 is connected between the conductor 299 by a resistor 411 and the common ground conductor 290 by a normally open reed switch 183 which is actuated by the magnet 201 attached to the arm 199 which is integrally connected to the shoe assembly 195. To provide latching for the relay K–9, the terminal 413 associated with the relay contact 403 is connected between the coil 409 and the reed switch 183. Connected between the resistor 411 and the coil 409 of the relay K–9 is a terminal 415 of a relay K–10. Associated with the terminal 415 of the relay K–10 is a normally open relay contact 417. The coil 419 of the relay K–10 is connected between the conductor 299 and the normally open relay contact 417. Another normally open relay contact 421 is mechanically connected to the relay contact 417 and electrically connected to it by a reed switch 204 which is actuated by the magnet 202 that is attached to the pivotally connected arm 199 of the incoming packaged integrated circuit sensor 200. Associated with the normally open relay contact 421 is a terminal 423 which is connected to the common ground conductor 290.

The electrically actuated brake 45 is connected between the common ground conductor 290 and a terminal 425 of the relay K–8 which is connected by the relay contact 399 to the conductor 299 when the relay is de-energized. The electrically actuated clutch 47 is connected by a resistor 431 between a terminal 429 which is connected by the relay contact 403 to the common ground conductor 290 when the relay K–8 is de-energized, and a terminal 427 associated with the relay contact 399 of the relay K–8. A capacitor 433 and a resistor 435 are connected in parallel between the conductor 299 and the junction between the clutch 47 and the resistor 431. The solenoid 227 and a normally open switch 437 designated Test Switch are connected in series between the common ground conductor 290 and a terminal 439 of the relay K–8 which is connected by the relay contact 397 to the conductor 299 when the relay K–8 is de-energized.

Connected to the junction between the terminal 417 and the coil 419 of the relay K–10 is a terminal 441 of a two-position switch 443 designated Operation Mode. One position of the Operation Mode switch 443 is designated Manual, and a terminal 445 associated with this position is connected to common ground conductor 290 by a normally open switch 447 designated Manual Advance. The other position associated with the Operation Mode switch 443 is designated Automatic, and a terminal 449 associated with this portion is connected to a normally open relay contact 451 of the relay K–11 designated Automatic Advance 453. The terminal 455 associated with the relay contact 451 is connected to the common ground conductor 290. The coil 457 of the relay K–11 is connected between the common ground conductor 290 and the Test Computer 379 which is designed to supply a pulse and energize the coil upon the completion of a series of programmed tests. The power for the Test Computer 379 is generally indicated by a conductor leading to a B+ power supply. A plurality of conductors 461 may supply voltages and currents of varying magnitudes from the programmable Test Computer 379 to the contact pins 169 protruding from the test socket 161. The Test Computer 459 is actuated by the closing of a reed switch 185 which is connected between the test circuitry 459 and the common ground conductor 290 by a diode 462. The magnet 201 which actuates the reed switch 185 is attached to the arm 199 which is integrally connected to the shoe assembly 195.

Connected in series across the conductor 299 and the common ground conductor 290 is a lamp 463 and a normally open reed switch 119 which is actuated by a magnet 121 attached to the end of the pivotally connected arm 111 of the empty magazine sensor 110. Energization of the lamp 463 indicates that all of the packaged integrated circuits from a loaded magazine 63 inserted into the input section 57 of the apparatus 11 have been fed onto the transport tape 51. Also connected in parallel across the conductor 299 and the common ground conductor 290 are a pair of serially connected counters and associated reed switches. The input counter 67 is connected between the conductor 299 and the common ground conductor 290 by a reed switch 27 which is closed by the movement of the magnet 125 into proximity therewith as a result of a packaged integrated circuit passing through the input section 57 and engaging the protruding finger of the arm 69 to which the magnet 125 is attached. The output counter 71 is connected between the conductor 299 and the common ground conductor 290 by a reed switch 128 which is closed by the movement of the magnet 126 into proximity therewith as a result of a packaged integrated circuit passing through the discharge section 59 and engaging the protruding finger of the arm 73 to which the magnet 126 is attached.

In operation, the operator will close the Pump Control switch 305 thereby energizing the coil 302 of the relay K–1 to close the normally open relay contact 265 in the $\phi_1$ line. In addition, the energization of the coil 302 will close the other normally open relay contact 301 to connect the coil 317 of the relay K–3 and the coil 327 of the solenoid-actuated fast cool valve 281 to the conductor 290. The closing of the normally open relay contact 263 in the $\phi_1$ line supplies AC power to the pump motor 29 which causes the non-conductive liquid 79 to be pumped from the reservoir 25 through the distributing head 15 into the tank 13. The liquid 79 will flow through the slotted weir 21 to the drain 19, and the level of the fluid bath will rise to a predetermined height until the cross-sectional area of the weir 21 permits a volume of fluid 79 to flow into the drain end of the tank 13 that is equal to the volume of fluid 79 being pumped at the selected pump rate into the tank 13 through the distributing head 17, the pump rate being selected to provide the desired fluid bath level.

Next, the operator will set the Temperature Controller 279 for the temperature at which he desires to test the integrated circuits and close the Thermal Control switch 313. The closing of the Thermal Control switch 313 will energize the coil 309 of the relay K–2 and thereby close the first normally open relay contact 267 in the $\phi_2$ line and also the normally open relay contact 275 in the $\phi_3$ line thereby supplying AC power to the Temperature Controller 279. If the operator desires to test the integrated circuits at a temperature less than room temperature, the temperature sensor 281 which is connected to the Temperature Controller 279 will sense that the temperature of the bath is greater than the desired temperature and accordingly the Temperature Controller 279 will not supply any AC power to the slow heat element 91. The voltage across the slow heat element is indicative of the relative temperature of the bath and since no voltage is being supplied to the slow heat element 79 there will be no voltage supplied to the base of the transistor 365 which controls the energization of the coil 363 of the relay K–6. Therefore, the relay K–6 will remain in its normally de-energized condition and the coil 335 of the solenoid-actuated slow cool valve 283 will be energized by the connection of the coil 335 to the common ground conductor 290 through the relay contact 337 so as to permit a small volume of coolant to flow through the cooling coils 83 and begin slowly cooling the liquid bath.

If the operator desires to test the integrated circuits at a very low temperature, then he may increase the cooling rate of the liquid bath by pressing the normally open, latching, push button Fast Cool switch 331, which will close the normally open relay contact 333, thereby energizing the coil 327 of the solenoid-actuated fast cool valve 85. In addition, the contact 345 will be closed, thereby energizing the coil 341 and latching the Fast Cool switch 331 into a closed condition.

When the liquid bath is cooled to the temperature set by the operator, the temperature sensor 281 will sense the condition of the bath and cause the temperature controller 279 to supply AC power to the slow heat element 91. The voltage across the slow heat element 91 will cause current to flow through the diode 367 and the resistor 369 to the common ground conductor 290. Since the voltage across the resistor 369 will normally be greater than the reference voltage established by the Zener diode 361, the transistor 365 will be biased into conduction and cause the coil 363 of the relay K–6 to be energized. The energization of the coil 363 of the relay K–6 will open the connection between the terminal 337 and the relay contact 339 so as to de-energize the coil 335 of the solenoid-actuated, slow cool valve 87 and block the passage of liquid nitrogen through the valve 87 to the cooling coils 83. At the same time the connection between the terminal 347 and the relay contact 349 will open so as to de-energize the coil 341 and unlatch the Fast Cool switch 331, thereby de-energizing the coil 327 of the solenoid-actuated fast cool valve 85 and blocking the flow of liquid nitrogen through the cooling coils 83. The flow of liquid nitrogen through the cooling coils 83 will remain blocked and AC power will be supplied to the slow heat element 91 so long as the temperature of the liquid bath is less than the pre-set temperature. Once the temperature rises above the pre-set value, the temperature controller 279 will no longer supply AC power to the slow heating element, thereby removing the forward bias from the base of the transistor 365 and causing the coil 363 of the relay K–6 to be de-energized to permit the relay to revert to its previous condition wherein the slow cool valve 87 is actuated so as to permit a small quantity of coolant to flow through the cooling coils 83 to cool the liquid bath to the desired temperature. To prevent the coil 365 of the relay K–6 from being energized and then de-energized during each cycle because of the intermittently pulsating DC which is applied to the base of the transistor 365, the capacitor 371 connected across the resistor 369 charges to a value sufficient to maintain the transistor 365 in conduction during the portions of each cycle when there is no voltage drop across the resistor 369.

On the other hand, if the operator desires to test the integrated circuits at a temperature greater than room temperature, the temperature sensor 281 which is connected to the temperature control 279 will sense that the temperature of the bath is less than the desired temperature and accordingly the temperature controller 279 will supply AC power to the slow heat element 91. The voltage across the slow heat element 91 will cause the current to flow through the diode 367 and cause a voltage drop across the resistor 369 which will bias the transistor 365 into conduction, thereby energizing the coil 363 of the relay K–6. The energization of the relay K–6 will open the connection between the terminal 337 and the relay contact 339 thereby de-energizing the coil 335 of the solenoid-actuated slow cool valve 87 and blocking the flow of coolant through the cooling coils 83. In addition, the energization of the relay K–6 will open the connection between the relay contact 349 and the terminal 347 and close the connection between the relay contact 349 and the terminal 357, thereby connecting the contact 355 of the Fast Heat switch 323 to the common ground conductor thereby enabling the latching circuit to be energized. If the desired temperature is much greater than the ambient temperature, the operator may desire to close the Fast Heat push button switch 323, thereby energizing the coil 317 of the relay K-3 to close the normally open relay contact 271 and cause AC power to be supplied to the fast heat element 89 to increase the rate of heating of the liquid bath. The closing of the Fast Heat switch 323 will also close the normally open contact 355, thereby energizing the coil 351 and latching of the Fast Heat switch 323 into its closed position.

The heating of the liquid bath will continue until the temperature of the liquid bath exceeds the desired temperature. When this happens the temperature controller 279 will no longer supply AC power to the slow heat element 91, thereby removing the forward biasing voltage from the base of the transistor 365 and rendering it non-conductive so as to de-energize the coil 363 of the relay K-6 and permit it to revert to its de-energized condition. The de-energization of the relay K-6 will open the relay contact 349, thereby unlatching the Fast Heat switch 323, which will de-energize the coil 317 of the relay K-3 and remove the AC power from the fast heat element 89. In addition, the connection between the terminal 337 and the relay contact 339 will be closed so as to energize the coil 335 of the solenoid-actuated slow cool valve 87, thereby opening the valve and permitting a small quantity of liquid nitrogen to flow through the cooling coils 83 to cool the liquid bath to the desired temperature.

When the operator desires to operate the transport tape 51 and test assembly 33, he will first close the normally open Transport Power switch 295, thereby supplying power from the positive terminal 287 of the 24-volt power supply to the conductor 299. Since the reed switch 183 is normally closed due to the proximity of the magnet 201 on the integrally connected arm 199 of the shoe assembly 195, the coil 409 of the relay K-9 will be energized so as to open the connection between the terminal 407 and the relay contact 401 to maintain the relay K-8 in its de-energized condition, and also to close the connection between the terminal 429 and the relay contact 403 thereby latching the relay K-8 into its energized condition. Since the relay K-8 is maintained in its de-energized condition, the electrically actuated brake 47 remains energized by the closed connection of the terminal 425 and the relay contact 399 while the electrically actuated clutch 47 remains de-energized by the open condition of the terminals 427 and 429.

Next, the operator will close the Transport Tape switch 383 which will supply AC power from the $\phi_1$ line to the motor 49, and thereby cause it to operate. The closing of the Transport Tape switch 383 will also close the connection between the relay contact 387 and the terminal 391, thereby energizing the coil 389 and latching the switch 383 into its closed condition. The apparatus 11 is now ready to start testing the packaged integrated circuits and the operator need only select the mode of operation, whether it be manual or automatic, and insert one or more packaged integrated circuits into the input section 57 of the apparatus. The operator may feed the packaged integrated circuits onto the transport tape 51 by either manually dropping one or more of them into the input section 57 of the apparatus 11, or inserting a magazine 63 loaded with a plurality of packaged integrated circuits into the input section 57 of the apparatus 11.

In either case, the operator will next select the mode of operation in which he desires to operate the apparatus 11. This is done by moving the two-position Operation Mode switch 443 to either the Manual 445 or Automatic 449 position. If the operator selects the manual mode of operation, then it is necessary for the operator to momentarily close the normally open Manual Advance switch 447 to cause movement of the transport tape 51. Upon momentarily closing the Manual Advance switch 447, the coil 419 of the relay K-10 will be energized to close a connection between the normally open relay contact 417 and the terminal 415, thereby shorting the coil 409 of the relay K-9 and causing it to revert to its de-energized condition which in turn causes the coil 405 of the relay K-8 to be energized so as to open the connection between the relay contact 379 and the terminal 425 so as to deactuate the brake 45, and also to close the connection between the relay contact 399 and the terminal 427 to actuate the clutch 47 to mechanically connect the continuously operating motor 49 to the drive drum 39, and thereby cause the movement of the transport tape. Since no packaged integrated circuits have yet approached the testing assembly 33, the magnet 202 attached to the pivotally connected arm 198 of the incoming packaged integrated circuit sensor 200 is in proximity with the reed switch 204 so as to maintain it in a closed condition and thereby latch the relay K-10 into its closed condition.

As a packaged integrated circuit is carried along by the movement of the transport tape 51, it first engages the protruding finger of the pivotally connected arm 69 of the input counter 67 to move the magnet 125 attached thereto into proximity with the reed switch 127 thereby energizing the input counter 67 to register the passage of a packaged integrated circuit through the input section 57 of the apparatus 11. Next, the packaged integrated circuit is submerged into the temperature-controlled liquid bath contained in the tank 13, thereby changing its temperature to that of the bath as it moves along the long, horizontal conditioning run of the tape adjacent the bottom of the tank 13 towards the test assembly 33.

As each packaged integrated circuit enters the test assembly 33, the lug 77 of the packaged integrated circuit 65 engages the upwardly protruding finger 196 of the incoming packaged integrated circuit sensor 200 which causes the arm 198 to pivot, thereby moving the magnet 202 attached thereto out of proximity with the reed switch 204 to open the latching circuit of the relay K-10. At approximately the same instant, the beveled corner 75 of the packaged integrated circuit engages and depresses the first protruding nipple 203 on the pivotally connected shoe assembly 195, thereby moving the magnet 201 attached to the end of the integrally connected arm 109 out of proximity with the reed switch 183, so as to open the switch 183 and prevent the coil 409 of the relay K-9 from being energized. As the packaged integrated circuit moves further into the test assembly 33, the lug 77 of the packaged integrated circuit will pass the upwardly protruding finger 196 of the pivotally connected arm 198 of the incoming packaged integrated circuit sensor 200, thereby permitting the magnet 202 attached to the arm 198 to move back into proximity with the reed switch 204 and close it. However, since the relay K-10 is already unlatched and in its de-energized condition, the closing of the reed switch 204 will not affect the operation of the circuit. As the packaged integrated circuit moves still further into the test assembly 33, it will pass over the first protruding nipple 203 on the shoe assembly 195 so as to no longer depress it and thereby permit the resiliently biased, integrally connected arm 199 to swing outward to again bring the magnet 201 into proximity with the reed switch 183, so as to close it and cause the coil 409 of the relay K-9 to be energized. The energization of the relay K-9 will open the connection of the relay contact 401 and the terminal 407 so as to de-energize the coil 405 of the relay K-8 and permit it to revert to its de-energized condition. The de-energization of the relay K-8 will open the connection of the relay contact 399 and the terminal 427, thereby deactuating the clutch 47, and closing the connection of the relay contact 399 and the terminal 425 thereby actuating the brake 45 so as to stop the movement of the transport tape 51 and also close the connection of the relay contact 397 and the terminal 439. In addition, the energization of the relay K-9 will close the connection of the relay contact 403 and the terminal 413 to latch the relay into its energized condition.

At this time the apparatus is ready for the Test Computer to perform a series of programmed tests on the packaged integrated circuit. These tests are initiated by the operator closing the normally open Test switch 437 to energize the solenoid 227 and cause the clevis 211 and U-shaped bracket 181 to drop downward toward the test socket 161. As they drop downward the two guide pins 170 on the test socket 161 engage the two holes 78 in the integrated circuit package, thereby bringing the exposed terminals 80 of the packaged integrated circuit into proper registration with the outwardly protruding and resiliently biased contact pins 169 of the test socket 161. The resiliently biased contact pins 169 resist the downward movement of the packaged integrated circuit, thereby forcing the back of the package into engagement with the clevis 211. The downward movement of the U-shaped bracket 181 also carries the arm 199 downward, thereby moving the magnet 201 out of proximity with the reed switch 183 and causing it to open, and into proximity with the reed switch 185, and causing it to close. Although the opening of the reed switch 183 removes a connection of the coil 409 to the common ground conductor 290, the relay K-9 remains in its energized condition due to the latching provided by the closed connection of the terminal 413 and the relay contact 403. The closing of the reed switch 185 provides a ground connection for the Test Computer 379, thereby actuating it and initiating a series of programmed tests on the packaged integrated circuit, through conductors 461 and contact pins 169, to determine its electrical characteristics.

When the tests are completed, the operator must once again momentarily depress the normally open Manual Advance switch 447 which again energizes the coil 419 of the relay K-10 to close the connection of the relay contact 417 and the terminal 415, thereby shorting the coil 409 of the relay K-9 and causing it to revert to its de-energized condition. Since the magnet 202 is again in proximity with the reed switch 204, the energization of the relay K-10 closes the relay contact 421 and the terminal 423, thereby latching the relay K-10 into its energized condition. When the relay K-9 reverts to its de-energized condition, the relay contact 403 is connected to the terminal 429 to initiate the charging of the capacitor 433. In addition, the relay contact 401 is connected to the terminal 407 to energize the coil 405 of the relay K-8. The energization of the relay K-8 opens the connection of the terminal 439 and the relay contact 397 to de-energize the solenoid 227 and cause the packaged integrated circuit to be lifted from the test socket 161 and onto the transport tape 51. In addition, it opens the connection of the terminal 425 and the relay contact 399 to de-actuate the brake 45 and closes the connection of the terminal 427 and the relay contact 399 to actuate the clutch 47. Since the de-actuation of the solenoid 227 is relatively slow in comparison with the actuation of the clutch 47, it is necessary that the actuation of the clutch 47 be delayed until the U-shaped bracket 181 can lift the packaged integrated circuit off the test socket 161 and place it laterally back onto the transport tape 51. This is accomplished by the time delay circuit including the capacitor 433, connected in parallel with the clutch 47. When the relay K-9 is in its energized condition and the clevis 211 is pressing the packaged integrated circuit onto the test socket 161, the resistor 437 discharges the capacitor 433. However, when the relay K-9 reverts to its de-energized condition and causes the relay K-8 to revert to its energized condition, the uncharged capacitor 433 initially acts as a short circuit across the clutch 47, and the actuation of the clutch 47 is delayed until the charge on the capacitor 433 approaches the voltage of the conductor 299. The period of time necessary for the capacitor 433 to become charged is determined by the values of the capacitor 433 and the resistor 431. It is during this period of time that the de-actuated solenoid lifts the packaged integrated circuit from the test socket 161.

When the clutch 47 is again actuated after the time delay, it mechanically connects the continuously running motor 49 to the drive drum 39 and again causes the transport tape 51 to progress. The movement of the transport tape 51 will carry the packaged integrated circuit out of the test assembly 33, along the bottom of the tank 13, under and around the drive drum 39, where it will emerge from the temperature-controlled liquid bath, and along the narrow upwardly extending groove 139 where it will enter the discharge section 59 of the apparatus 11. As the packaged integrated circuit enters the discharge section 59 it will engage the protruding finger of the pivotally connected arm 73 of the output counter 71 so as to move the magnet 126 attached thereto into proximity with the reed switch 128 thereby actuating the output counter 71 to register the passage of a packaged integrated circuit through the discharge section 59 of the apparatus 11. After passing the protruding finger of the arm 73 of the output counter 71, the packaged integrated circuit will be ejected from the discharge section 59 of the apparatus 11 by the ears 55 of the transport tape 51 engaging the rearward beveled corners 75 of the packaged integrated circuit so as to push it out of the discharge section 59.

If more than one packaged integrated circuit has been fed onto the transport tape 51, then the movement of the transport tape 51 will stop each time a packaged integrated circuit enters the test assembly 33, and the operator must press the Manual Advance switch 447 to again cause the progressing movement of the transport tape. The sequence of operation, as described above, must be continued for each packaged integrated circuit fed into the input section 57 of the apparatus 11 while the Operation Mode switch is in the Manual position.

If the operator selects the automatic mode of operation, then the operation is essentially the same as previously described except that the control of the movement of the transport tape is transferred from the manual control of the operator to the automatic control of the Automaic Advance relay 453. In this case, the operator will move the arm of the Operation Mode switch 443 to the Automatic position 449 and close the Test switch 437. When the operator closes a switch, not shown, on the computer 379, the computer will thereupon supply a pulse to the coil 457 of the relay K-11, thereby energizing the coil 457 and closing the Automatic Advance relay 453 initiating the operation of the circuit the same as in the case of the manual mode of operation wherein the Manual Advance switch 447 is momentarily closed. The remainder of the operation of the apparatus 11 is the same as in the manual mode of operation with the exception that after the series of programmed tests have been performed upon a packaged integrated circuit, the test circuitry 459 contained in the computer 379 will, by conventional or other desired programming, supply another pulse to the coil 457 of the Automatic Advance relay 453 which will again close it so as to continue the operation of the apparatus 11 as hereinbefore described until another packaged integrated circuit enters the test assembly 33 whereupon the sequence of operations will be repeated.

If a magazine 63 is used to feed a plurality of packaged integrated circuits onto the transport tape 51, then a loaded magazine 63 will be inserted into the input section 57 in such a manner that the notches 253 in the feet 259 of the magazine 63 will engage the studs 233 protruding from the vertical side 231 of the overhead, wedge-shaped bracket 61 so as to maintain the magazine 63 in an upright, properly aligned position and further so that the outwardly extending ends 251 of the stop springs 253 will engage the side plates 93 and 95, causing the springs 253 to be spread apart and thus allow the packaged integrated circuits to fall from the magazine 63 onto the transport tape 51. The insertion of the loaded magazine 63 into the input section 57 of the apparatus 11 also causes the packaged integrated circuits in the magazine 63 to engage the pivotally connected arm 111 of the empty magazine sensor 110 to move the magnet 121 attached thereto out of proximity with the reed switch 119 thereby opening it and preventing the energization of the lamp 463. The movement of the transport tape 51 will carry the packaged integrated circuits away from the input section 57 until all of the packaged integrated circuits have fallen from the magazine 63 onto the transport tape 51. As the last packaged integrated circuit falls from the magazine 63 the pivotally connected arm 111 will return to its normal position and bring the magnet 121 into proximity with the reed switch 119 so as to close it and thereby energize the lamp 463 which will indicate to the operator that the magazine 63 is empty.

After the packaged integrated circuits have been fed into the input section 57, the movement of the transport tape 51 will carry them through the apparatus 11, where they will be tested, to the discharge section 59. If a magazine 63 is used to collect the packaged integrated circuits from the transport tape 51, then an empty magazine 63 will be inserted into the discharge section 59 in such a manner that the notches 265 in the feet 261 of the magazine 63 will engage the studs 237 protruding from the sloping side 235 of the overhead, wedge-shaped bracket 61 so as to maintain the magazine 63 in an upwardly sloping position that is properly aligned with the narrow upwardly sloping grooves 139 in the parallel plates 131 and 133. As each packaged integrated circuit moves into the discharge section 59 of the apparatus 11, the forward beveled corners 75 of each packaged integrated circuit will engage the bent ends 247 of the control springs 245 of the magazine 63 and spread them apart as the packaged integrated circuit is pushed into the magazine by the ears 55 of the transport tape 51 which engage the rearward beveled corners 75 of the packaged integrated circuit. When the packaged integrated circuit is pushed into the magazine 63 sufficiently so that the ends of the springs 245 engage the rearward beveled corners 75 of the packaged integrated circuits, the springs 245 will move inward towards each other and pull the packaged integrated circuit further into the magazine so as to retain it and prevent it from sliding back onto the transport tape 51. This process will be repeated as each packaged integrated circuit is pushed into the magazine 63, until it becomes fully loaded whereupon the first, or leading, packaged integrated circuit to enter the magazine 63 will be pushed to the opposite end of the magazine. The leading packaged integrated circuit will thereupon engage the outwardly protruding arm 239 of the normally closed Magazine Full switch 395 contained in the overhead bracket 61 which will open the switch 395 so as to de-energize the coil 389 of the latching circuit of the Transport Tape switch 383 thereby turning off the continuously running motor 49 and stopping the movement of the transport tape 51.

While the invention has been illustrated and described with respect to a single preferred embodiment, it will be apparent to those skilled in the art that various embodiments, modifications and improvements may be made without departing from the scope and spirit of the invention. For example, a multi-speed pump motor could be used to compensate for the variable load on the motor due to variations in the viscosity of the non-conductive fluid as a result of temperature changes. Other types of fluorocarbon compounds or combinations thereof, such as Freon E1 and Freon E5 could be used to condition and stabilize the temperature of packaged integrated circuits submerged in the liquid bath. Also, other types of transport tapes could be used to engage the packaged integrated circuits, and/or the packaged integrated circuits could be removed in a horizontally lateral direction for testing, rather than vertically lateral direction as illustrated in the disclosed embodiment of the test apparatus.

In addition, the transport tape could move in a generally arcuate path in a horizontal plane through the non-conductive fluid bath rather than a longitudinally extending path as illustrated in the present embodiment. Furthermore, the reed switches and the cover-latching solenoid could be externally located on the apparatus, the tank and the parallel plates could be covered with a temperature-insulating material, and means, for example an adjustable bracket, could be used to vary the tension exerted by the tension spring on the idler wheel. Accordingly, it is to be understood that the invention is not to be limited by the illustrated embodiment, but only by the scope of the appended claims.

That which is claimed is:

1. Apparatus for testing electrical circuits in a liquid bath utilized to condition and stabilize the temperature of the circuits, comprising:

a tank adapted to contain a liquid bath, a bath of substantially nonconductive liquid contained in said tank, a test station having a plurality of contacts adapted to engage an electrical circuit and being mounted and submerged in said liquid bath, a test computer electrically connected to the contacts of said test station externally of said tank and adapted to apply and sense the result of selected electrical signals at selected contacts of said test station to test an electrical circuit engaging the contacts, and means to submerge an electrical circuit in said liquid bath in said tank for a period of time prior to the testing operation sufficient to condition and stabilize the temperature of the electrical circuit at the temperature of the liquid bath and effect engagement of the electrical circuit with the contacts of said test station to enable a test operation to be performed upon the electrical circuit assembly by said test computer, means to move an electrical circuit at a sufficient speed along a temperature conditioning and stabilizing path of sufficient length through said liquid bath to condition and stabilize the temperature of the electrical circuit at the temperature of said liquid bath prior to the electrical circuit engaging the contacts of said test station to enable the test operation to be performed, heaing and cooling apparatus in heat transfer relation with the liquid and adapted to heat and cool the liquid, a temperature sensor in thermal conductivity with said liquid bath and adapted to produce a signal indicative of the temperature of said liquid bath, and temperature control means responsive to the signal produced by said temperature sensor and in controlling relationship to said heating and cooling apparatus to selectively control the temperature of said liquid bath and cause said liquid to be heated and cooled to a selected temperature, a circulating means for circulating the non-conductive liquid of said bath from said heating and cooling apparatus to said test station and along said temperature conditioning and stabilizing path to insure the temperature of the liquid at said test station being closely related to that of said heating and cooling apparatus and insure the uniform temperature conditioning and stabilizing of the electrical circuits, and said circulating means including laminar flow effective means for effecting a laminar flow of said fluid at said test station and along said temperature conditioning and stabilizing path to obviate undesired turbulant fluid motion induced movement of the electrical circuits as they move along said temperature conditioning and stabilizing path and engage the contacts and undergo testing at said test station.

2. Apparatus for testing electrical circuits in a liquid bath utilized to condtion and stabilize the temperature of the circuits according to claim 1, further comprising:
a weir adapted to control the level of said liquid bath and having a vertical slot formed therein extending closely adjacent to the bottom of the tank to enable a laminar flow of liquid adjacent the bottom of the tank, past the test station and along a portion of the temperature conditioning and stabilizing path adjacent to the bottom of the tank to ensure a substantially uniform temperature from the test station throughout the length of the temperature conditioning and stabilizing path.

3. Apparatus for testing electrical circuits in a liquid bath utilized to condition and stabilize the temperature of the circuits according to claim 1.
said temperature sensor being mounted in close, temperature-related proximity to said test station to ensure the test operation being performed at the selected temperature.

4. Apparatus for testing electircal circuits in a liquid bath utilized to condition and stabilize the temperature of the circuits according to claim 3, wherein said means to submerge an electrical circuit in said liquid bath and move the electrical circuit through said liquid bath to condition and stabilize the temperature of the electrical circuit comprises:
a transport device arranged to move into the liquid bath along the temperature conditioning and stabilizing path and having a series of parallel, laterally protruding ears adapted to engage electrical circuits therebetween, and
drive means to move said transport tape at a sufficient speed along the temperature conditioning and stabilizing path to enable the test operation to be performed at a selected temperature.

5. Apparatus for testing electrical circuits in a liquid bath with close temperature control above and below ambient temperature, comprising:
a tank adapted to contain a liquid bath,
a bath of substantially nonconductive liquid contained in said tank,
a test station having a plurality of contacts adapted to engage an electrical circuit and being submerged in said liquid bath,
a test computer electrically connected to the contacts of said test station externally of said tank and adapted to apply and sense the result of selected electrical signals at selected contacts of said test station to test an electrical circuit engaging the contacts,
heating and cooling apparatus in heat transfer relation with the liquid and adapted to heat and cool the liquid,
a temperature sensor in thermal conductivity with said liquid bath and adapted to produce a signal indicative of the temperature of said liquid bath, and
temperature control means responsive to the signal produced by said temperature sensor and in controlling relationship to said heating and cooling apparatus to selectively control the temperature of said liquid bath and cause said liquid bath to be heated and cooled to a selected temperature,
said temperature sensor being mounted in close, temperature-related proximity to said test station to ensure the test operation being performed at substantially the selected temperature,
said heating and cooling apparatus being actuated by said temperature control means to effect one of either heating or cooling of said liquid bath as a direct function of the sensed temperature of the bath being below or above the selected temperature,
said heating and cooling apparatus having plural rates of heating and cooling and being actuated by said temperature control means to effect different rates of heating and cooling as a direct function of the sensed temperature of said liquid bath and always effect a minimum rate of one of either heating or cooling of said liquid bath to closely control the temperature thereof.

6. Apparatus for testing electrical circuits in a liquid bath with close temperature control above and below ambient temperature, according to claim 5, wherein:
said temperature control means effecting a change in said heating and cooling apparatus between heating and cooling of said liquid bath as an inverse function of the sensed temperature of said liqiud bath relative to the selected temperature to closely control the temperature of said liquid bath.

7. Apparatus for testing electrical circuits in a liquid bath with close temperature control above and below ambient temperature, according to claim 6, further comprising:
a removable cover adapted to enclose said tank,
a cover-locking means attached to said tank and adapted to lock said cover onto said tank when the temperature of said liquid bath contained therein varies more than a predetermined amount from an ambient temperature.

8. Apparatus for testing electrical circuits in a liquid bath with close temperature control above and below ambient temperature according to claim 7, further comprising:
a common ground terminal,
a power supply having first and second output terminals with the first output terminal being connected to said common ground terminal,
said cover-locking means being actuated by a solenoid having a coil with first and second terminals with the first terminal being connected to the first terminal of said power supply,
a first thermostat operated switch adapted to connect a second terminal of the coil of said cover locking means to the second terminal of said power supply when the temperature of said liquid bath is decreased more than a predetermined amount below ambient temperature, and
a second thermostat operated switch adapted to connect the second terminal of the coil of said cover locking means to the second terminal of said power supply when the temperature of said liquid bath is increased more than a predetermined amount above ambient temperature.

9. Apparatus for testing electrical circuits in a liquid bath with close temperature control above and below ambient temperature, comprising:
a tank adapted to contain a liquid bath,
a bath of substantially nonconductive liquid contained in said tank,
a test station having a plurality of contacts adapted to engage an electrical circuit and being submerged in said liquid bath,
a test computer electrically connected to the contacts of said test station externally of said tank and adapted to apply and sense the result of selected electrical signals at selected contacts of said test station to test an electrical circuit engaging the contacts,
heating and cooling apparatus in heat transfer relation with the liquid and adapted to heat and cool the liquid,
a temperature sensor in thermal conductivity with said liquid bath and adapted to produce a signal indicative of the temperature of said liquid bath, and
temperature control means responsive to the signal produced by said temperature sensor and in controlling relationship to said heating and cooling apparatus to selectively control the temperature of said liquid bath and cause said liquid bath to be heated and cooled to a selected temperature,
said heating and cooling apparatus being actuated by said temperature control means to effect one of either heating or cooling of said liquid bath as a direct function of the sensed temperature of the bath being below or above the selected temperature, means to submerge an electrical circuit in said liquid bath in said tank for a period of time prior to the testing operation sufficient to condition and stabilize the temperature of the electrical circuit at the temperature of the liquid bath and to effect engagement of the electrical circuit with the contacts of said test station to enable a test operation to be performed upon the electrical circuit by said test computer, means to move an electrical circuit at a sufficient speed along a temperature conditioning and stabilizing path of sufficient length through said liquid bath to condition and stabilize the temperature of the electrical circuit at the temperature of said liquid bath prior to the electrical circuit engaging the contacts of said test station to enable the test operation to be performed.

said heating and cooling apparatus having plural rates of heating and cooling and being actuated by said temperature control means to effect different rates of heating and cooling as a direct function of the sensed temperature of said liquid bath and always effect at least a minimum rate of one of either heating or cooling of said liquid bath to closely control the temperature thereof, and said temperature control means effecting a change in said heating and cooling apparatus between heating and cooling of said liquid bath as an inverse function of the sensed temperature of said liquid bath relative to the selected temperature to closely control the temperature of said liquid bath.

10. An apparatus for testing electrical circuits in an electrical bath with close temperature control above and below ambient temperature according to claim 9, further comprising:

a fluid inlet formed in one portion of said tank laterally in one direction of said test station, a fluid outlet formed in another portion of said tank laterally in an opposite direction of said test station and beyond the temperature conditioning and stabilizing path, a distributing head disposed in said tank and attached to said fluid inlet and having a plurality of lateral apertures opening toward said fluid outlet of said tank, a weir disposed in said tank between said test station and said fluid outlet and having a slot formed therein extending vertically upward from a level closely adjacent to the bottom of said tank to enable a laminar flow of liquid adjacent the bottom of the tank past the test station along a portion of the temperature conditioning and stabilizing path adjacent to the bottom of said tank to insure a substantially uniform temperature from said test station and throughout the length of the temperature conditioning and stabilizing path, a liquid reservoir with a fluid inlet and a fluid outlet and having said heating and cooling apparatus disposed therein, a conduit connecting said fluid outlet of said tank with the fluid inlet of said reservoir, a pump having an inlet and an outlet being adapted to circulate fluid therethrough.

a conduit connecting the inlet of said pump with the outlet of said reservoir, a conduit connecting the outlet of said pump with said inlet of said tank, said heating and cooling apparatus including first and second electrical heating elements with the first heating element being adapted to provide maximum rate of heating of the liquid and the second heating element being adapted to provide minimum rate of heating of said liquid and a cooling coil having a main valve adapted to permit a maximum amount of coolant to pass through said cooling coils to provide a maximum rate of cooling of said liquid and a bypass valve adapted to permit a minimum amount of coolant to pass through said cooling coils to provide a minimum rate of cooling of said liquid.

11. Apparatus for testing electrical circuits in a liquid bath with close temperature control above and below ambient temperature, according to claim 10, further comprising:

a removable cover adapted to enclose said tank, a cover-locking means attached to said tank and adapted to lock said cover onto said tank when the temperature of said liquid bath contained therein varies more than a predetermined amount from an ambient temperature.

12. Apparatus for testing electrical circuits in a liquid bath with close temperature control above and below ambient temperature according to claim 11, further comprising:

a common ground terminal, a power supply having first and second output terminals with the first output terminal being connected to said common ground terminal, said cover-locking means being actuated by a solenoid having a coil with first and second terminals with the first terminal being connected to the first terminal of said power supply, a first thermostat operated switch adapted to connect a second terminal of the coil of said cover locking means to the second terminal of said power supply when the temperature of said liquid bath is decreased more than a predetermined amount below ambient temperature, and a second thermostat operated switch adapted to connect the second terminal of the coil of said cover locking means to the second terminal of said power supply when the temperature of said liquid bath is increased more than a predetermined amount above ambient temperature.

13. Apparatus for testing electrical circuits in a liquid bath with close temperature control above and below ambient temperature according to claim 12 wherein, said temperature control means comprises:

a temperature control relay having a coil with a first and second terminals the first terminal being connected to the second output terminal of said power supply and having a first switch contact connected in controlling relation with the bypass valve of said cooling coil and adapted to permit the flow of coolant therethrough when the coil of said temperature control relay is unenergized and to block the flow of coolant therethrough when the coil of said temperature control relay is energized, and a current control device connecting the second terminal of the coil of said temperature control relay to said common ground terminal and having a control electrode adapted to sense the application of power to said second heating element and cause current to flow through said current control device to energize the coil of said temperature control relay and cause said bypass valve of said cooling coil to block the flow of coolant therethrough.

14. Apparatus for testing electrical circuits in a liquid bath with close temperature control above and below ambient temperature according to claim 13, further comprising:

a first input terminal adapted to be connected to a source of electric power, a second input terminal adapted to be connected to a source of electric power, a third input terminal adapted to be connected to a source of electric power, said pump being electrically driven and having first and second terminals with the first terminal being connected to said common ground terminal, a pump control relay having a coil with first and second terminals the first terminal being connected to the second output terminal of said power supply and having two mechanically connected switch contacts with the first switch contact being adapted upon energization of the coil of said pump control relay to connect said electrically driven pump to said first input terminal adapted to be connected to a source of electric power, a pump control switch being adapted to connect the second terminal of the coil of said pump control relay to said common ground terminal, said first electrical heating element having first and second terminals with the first terminal being connected to said common ground terminal, a fast heat relay having a coil with first and second terminals the first terminal being adapted to be connected to the second terminal of said power supply by the second switch contact of said pump control relay upon energization of the coil of the pump control relay and having a switch contact adapted to be connected to said second terminal of said first electrical heating element upon energization of the coil of said fast heat relay, a selectively adjustable temperature controller having input and output terminals and being electrically connected to said temperature sensor and responsive to the signal produced thereby to selectively control the amount of power passing through said temperature controller, said second electrical heating element having first and second terminals with the first terminal connected to said common ground terminal and the second terminal connected to the output terminal of said temperature controller, a terminal control relay having a coil with first and second terminals the first terminal being connected to the second terminal of said power supply and having first and second mechanically connected switch contacts with the first switch contact being adapted to connect the switch contact of said fast heat relay to said second input terminal adapted to be connected to a second source of electric power upon energization of the coil of said terminal control relay and the second switch contact being adapted to connect the input terminal of said temperature controller to said third input terminal adapted to be connected to a source of electric power upon energization of the coil of said thermal control relay, a thermal control switch adapted to connect the second terminal of the coil of said thermal control relay to said common ground terminal, said main valve of said cooling coil being actuated to permit coolant to flow therethrough by a solenoid having a coil with first and second terminals the first terminal being adapted to be connected to the second output terminal of said power supply by the second switch contact of said pump control relay, said bypass valve of said coil being actuated to permit coolant to flow therethrough by a solenoid having a coil with first and second terminals the first terminal being connected to the second output terminal of said power supply, and the second terminal being connected to said common ground terminal by a first switch contact of said temperature control relay, said temperature control relay having first and second fixed contacts and a second switch contact mechanically connected to the first switch contact and electrically connected to said common ground terminal and being adapted to engage the first fixed contact upon de-energization of the coil of said temperature control relay and adapted to engage the second fixed contact upon energization of the coil of said temperature control relay, a fast cool push-button latching control switch having a latching coil with first and second terminals the first terminal being connected to the second output terminal of said power supply and having first and second mechanically connected switch contacts with the first switch contact adapted to connect the second terminal of the coil of said solenoid actuated main cool valve to said common ground terminal and the second switch contact adapted to connect the second terminal of the latching coil of said fast cool switch to the first fixed contact adapted to be engaged by the second switch contact of said temperature control relay to energize the latching coil of said fast cool switch and thus maintain the energization of the coil of the solenoid of said main valve, and a fast heat push-button latching control switch having a latching coil with two terminals the first terminal being connected to the second terminal of said power supply and having two mechanically connected switch contacts with the first switch contact adapted to connect the second terminal of the coil of said fast heat relay to said common ground terminal and the second switch contact adapted to connect the second terminal of the latching coil of said fast heat switch to the second fixed contact adapted to be engaged by the second switch contact of said temperature control relay upon energization of said temperature control relay to energize the latching coil of said fast heat switch and thus maintain the energization of the coil of said fast heat relay.

15. Apparatus for testing electrical circuits in a liquid bath with close temperature control above and below ambient temperature according to claim 14, further comprising:

a diode connected to the output terminal of said temperature controller, a resistor and capacitor connected in parallel between said diode and said common ground terminal, a resistor and a Zener diode connected in series across the second terminal of said power supply and said common ground terminal to provide a reference voltage, said current control device being a transistor having emitter base and collector electrodes with the emitter electrode connected to the junction between said serially connected resistor and Zener diode and with the base electrode connected to the junction between said diode and said parallel connected resistor and capacitor and with the collector electrode connected to the second terminal of the coil of said temperature control relay whereby said transistor causes the energization of the coil of said temperature control relay when the voltage applied to the base electrode exceeds the reference voltage applied to the emitter electrode.

16. Apparatus for sequentially testing a series of electrical circuit packages in a liquid bath, comprising:

a tank adapted to contain a liquid bath, a bath of substantially non-conductive liquid contained in said tank, a test station having a plurality of contacts adapted to engage a packaged electrical circuit and being mounted and submerged in said liquid bath, a test computer electrically connected to the contacts of said test station externally of said tank and adapted to apply and sense the results of selected electrical signals at selected contacts of said test station to test a packaged electrical circuit engaging the contacts, transport means to transport a series of electrical circuit packages by said test station where each electrical circuit may be tested, and sequential test-effecting means to sequentially cause each electrical circuit package passing by said test station to engage the plurality of contacts thereof and be subjected to a test operation performed by said test computer, means to sense an electrical circuit package in testing proximity with said test station and stop the transport movement of the electrical circuit package, means to effect engagement of said electrical circuit package with the contacts of said test station, means to initiate the test operation performed by said test computer, means to effect disengagement of said electrical circuit package from the contacts of said test station upon the completion of the test operation by said test computer, and means to cause the resumption of the transport movement of the electrical circuit package, means to guide said electrical circuit package into proper alignment with the plurality of contacts of said test station as the electrical circuit package effects engagement with the contacts of said test station, a transport device arranged to pass by said test station and having a series of parallel, laterally protruding ears adapted to engage electrical circuit packages therebetween, and drive means to move said transport tape being responsive to said means to sense an electrical circuit package in testing proximity with said test station and to said means to cause the resumption of the transport movement of said electrical circuit package from said test station upon completion of the test operation, said transport device having laterally inwardly facing and laterally inwardly tapered ears in plan view for complementary encompassing and positioning electrical circuit packages having a beveled corner configuration, and means to effect engagement and disengagement of an electrical circuit package with the contacts of said test station comprising:

a first member adapted to engage one portion of an electrical circuit package, a second member adapted to engage a second portion of the electrical circuit package opposite to the first portion, means to simultaneously move said first and second members laterally with respect to said transport device and effect engagement of the electrical circuit package with the contacts of said test station to enable the test operation to be performed, and means to simultaneously move said first and second members laterally with respect to said transport device and effect disengagement of the electrical circuit package with the contacts of said test station upon completion of the test operation.

17. Apparatus for sequentially testing a series of electrical circuit packages in a liquid bath according to claim 16:

said means to initiate the test operation performed by said test computer being responsive to the position of said first member after having been laterally displaced to cause an electrical circuit package to effect engagement with the contacts of said test station.

18. Apparatus for sequentially testing a series of electrical circuit packages in a liquid bath according to claim 17, further comprising:

an idler drum rotatably mounted in said tank laterally with respect from said test station, a drive drum rotatably mounted in said tank laterally from said test station in a direction opposite to that of said idler drum, drive means mechanically connected to said drive drum and adapted to cause it to rotate, said transport device being an endless tape engaging said idler drum and said drive drum, a first chute adapted to receive electrical circuit packages and serially feed them onto said transport tape, and a second chute adapted to serially receive and remove electrical circuit packages from said endless transport tape after having past by said test station.

19. Apparatus for sequentially testing a series of electrical circuit packages in a liquid bath according to claim 18, wherein:

said idler drum and said drive drum being partially submerged in said liquid bath to cause said endless transport tape to move into and out of said liquid bath, said first chute being positioned to feed electrical circuit packages onto said transport tape before it moves into said liquid bath, and said second chute being positioned to receive electrical circuit packages from said transport tape after it moves out of said liquid bath.

20. Apparatus for sequentially testing a series of electrical circuit packages in a liquid bath, comprising:

a tank adapted to contain a liquid bath, a bath of substantially non-conductive liquid contained in said tank, a test station having a plurality of contacts adapted to engage a packaged electrical circuit and being mounted and submerged in said liquid bath, a test computer electrically connected to the contacts of said test station externally of said tank and adapted to apply and sense the results of selected electrical signals at selected contacts of said test station to test a packaged electrical circuit engaging the contacts, transport means to transport a series of electrical circuit packages by said test station where each electrical circuit may be tested, and sequential test-effecting means to sequentially cause each electrical circuit package passing by said test station to engage the plurality of contacts thereof and be subjected to a test operation performed by said test computer, an idler drum rotatably mounted in said tank laterally with respect from said test station, a drive drum rotatably mounted in said tank laterally from said test station in a direction opposite to that of said idler drum, said drive means being mechanically connected to said drive drum and adapted to cause it to rotate, said transport device being an endless tape engaging said idler drum and said drive drum, a first chute adapted to receive electrical circuit packages and serially feed them onto said transport tape, and a second chute adapted to serially receive and remove electrical circuit packages from said endless transport tape after having passed by said test station, said idler drum and said drive drum being partially submerged in said liquid bath to move each portion of said endless transport tape into and out of said liquid bath, said first chute being positioned to feed electrical circuit packages onto said endless transport tape above said liquid bath, and said second chute being positioned to receive electrical circuit packages from said transport tape above said liquid bath, a continuously running motor, a clutch adapted to mechanically connect said motor and said drive drum when actuated and adapted to disconnect said motor and said clutch when de-actuated, a brake in operative relation with said drive drum and adapted to stop the rotational movement of said drive drum when actuated and adapted to prevent the free rotational movement thereof when de-actuated.

means responsive to an electrical circuit package in testing proximity with said test station to actuate said clutch to disconnect said motor from said drive drum and actuate said brake to stop the rotational movement of said drive drum and initiate the operation of said means to move said first and second members to effect engagement of the electrical circuit package with the contacts of said test station, and means to initiate the operation of said means to simultaneously move said first and second members to effect disengagement of the electrical circuit package with the contacts of said test station and deactuate said brake and actuate said clutch to mechanically connect said motor to said drive drum to cause the resumption of the transport movement of the electrical circuit package.

21. Apparatus for sequentially testing a series of electrical circuit packages in a liquid bath according to claim 20, further comprising:
means to cause a time delay between the initiation of the operation of said means to simultaneously move said first and second members to effect disengagement of the electrical circuit package with the contacts of said test station and said means to cause the resumption of the transport movement of the electrical circuit package.

22. Apparatus for sequentially testing a series of electrical circuit packages in a liquid bath according to claim 21, further comprising:
a common ground terminal,
a power supply having first and second output terminals with the first output terminal being connected to said common ground terminal,
said clutch being electrically actuated having first and second terminals,
said brake being electrically actuated having first and second terminals with the first terminal being connected to said common ground terminal,
said means to simultaneously move said first and second members laterally with respect to said transport device being actuated by a solenoid having a coil with first and second terminals with the first terminal being connected to said common ground terminal,
a first relay having a coil with first and second terminals the first terminal being connected to the second output terminal of said power supply and having first and second mechanically connected switch contacts with the first switch contact being adapted to connect the second terminal of the coil of said test solenoid to the second output terminal of said power supply upon de-energization of the coil of said first relay and the second switch contact being adapted to connect the second terminal of said electrically actuated brake to the second output terminal of said power supply upon de-energization of the coil of said first relay and adapted to connect the first terminal of said electrically actuated clutch to the second output terminal of said power supply upon energization of the coil of said relay,
a second relay having a coil with first and second terminals and having first and second mechanically connected switch contacts with the first switch contact being adapted to connect the second terminal of the coil of said first relay to said common ground terminal upon de-energization of the coil of said second relay and with the second switch contact being adapted to connect the second terminal of said electrically actuated clutch to said common ground terminal upon de-energization of the coil of said second relay and adapted to connect the first terminal of the coil of said second relay to said common ground terminal upon energization of the coil of said second relay,
a magnetically actuated reed switch adapted to connect the first terminal of the coil of said second relay to said common ground terminal,
a resistor connecting the second terminal of the coil of said second relay to the second output terminal of said power supply, a third relay having a coil with first and second terminals the first terminal being connected to the second output terminal of said power supply and having first and second mechanically connected switch contacts with the first switch contact being adapted to connect the second terminal of the coil of said third relay to the second terminal of the coil of said second relay upon energization of the coil of said third relay and the second switch contact being adapted to be connected to said common ground terminal upon energization of the coil of said third relay,
a magnetically actuated reed switch adapted to connect the first switch contact to the second switch contact,
advance switch means adapted to momentarily connect the second terminal of the coil of said third relay to said common ground terminal,
means attached to said first member and being adapted to sence the presence of an electrical circuit package in testing proximity with said test station and cause said first magnetically actuated reed switch to connect the first terminal of the coil of said second relay to said common ground terminal,
means adapted to sense an electrical circuit package moving into testing proximity with said test station and cause said second magnetically actuated reed switch to open to electrically disconnect the first and second mechanically connected switch contacts of said third relay to cause the energization of the coil of said third relay.

23. Apparatus for sequentially testing a series of electrical circuit packages in a liquid bath according to claim 22:
said test computer being adapted to produce an electrical signal upon completion of the test operation, and
said advance switch means being responsive to the signal produced by said test computer upon completion of the test operation to momentarily connect the second terminal of the coil of said third relay to said common ground terminal.

24. Apparatus for sequentially testing a series of electrical circuit packages in a liquid bath according to claim 23, further comprising:
means adapted to count the number of electrical circuit packages passing through said first chute to be serially fed onto said endless transport tape, and
means adapted to count the number of electrical circuit packages passing through said second chute upon being serially removed from said endless transport tape.

25. Apparatus for sequentially testing a series of electrical circuit packages in a liquid bath according to claim 24, further comprising:
means adapted to place said endless transport tape under tension, and
means connected in controlling relation with said motor and responsive in reduction in the tension of said transport tape to stop the operation of said motor.

26. Apparatus for sequentially testing a series of electrical circuit packages in a liquid bath according to claim 25, further comprising:
means engaging said endless transport tape and adapted to maintain it on said drive drum and said idler drum to insure electrical circuit packages passing said test station in testing proximity.

27. Apparatus for testing electrical circuits in a liquid bath utilized to condition and stabilize the temperature of the circuits, comprising:
a tank adapted to contain a liquid bath,
a bath of substantially nonconductive liquid contained in said tank,
a test station having a plurality of contacts adapted to engage an electrical circuit and being mounted and submerged in said liquid bath.
means to submerge an electrical circuit in said liquid bath in said tank for a period of time prior to the testing operation sufficient to condition and stabilize the temperature of the electrical circuit at the temperature of the liquid bath and effect engagement of the electrical circuit with the contacts of said test station to enable a test operation to be performed upon the electrical circuit assembly by said test computer, means to move an electrical circuit at a sufficient speed along a temperature conditioning and stabilizing path of sufficient length through said liquid bath to condition and stabilize the temperature of the electrical circuit at the temperature of said liquid bath prior to the electrical circuit engaging the contacts of said test station to enable the test operation to be performed, temperature modification means in heat transfer relation with the liquid and adapted to heat and cool the liquid, a temperature sensor in thermal conductivity with said liquid bath and adapted to produce a signal indicative of the temperature of said liquid bath, and temperature control means responsive to the signal produced by said temperature sensor and in controlling relationship to said temperature modification means to selectively control the temperature of said liquid bath and cause said liquid to be modified to a selected temperature, a circulating means for circulating the non-conductive liquid of said bath from said temperature modification means to said test station and along said temperature conditioning and stabilizing path to insure the temperature of the liquid at said test station being closely related to that of said temperature modification means and insure the uniform temperature conditioning and stabilizing of the electrical circuits, and said circulating means including laminar flow effective means for effecting a laminar flow of said fluid at said test station and along said temperature conditioning and stabilizing path to obviate undesired turbulent fluid motion induced movement of the electrical circuits as they move along said temperature conditioning and stabilizing path and engage the contacts and undego testing at test station.

References Cited
UNITED STATES PATENTS

| | | | |
|---|---|---|---|
| 3,039,604 | 6/1962 | Bickel | 324—158X |
| 3,133,180 | 5/1964 | Suverkropp | 324—158UX |
| 3,179,248 | 4/1965 | Manley | 324—158X |
| 3,412,333 | 11/1968 | Frick | 324—158 |

OTHER REFERENCES

Semiconductor Products, vol. 5, No. 11, November 1962, pp. 24–27.

RUDOLPH V. ROLINEC, Primary Examiner

R. J. CORCORAN, Assistant Examiner

U.S. Cl. X.R.

165—26; 324—158